US010743261B2

(12) United States Patent
Boccardi et al.

(10) Patent No.: US 10,743,261 B2
(45) Date of Patent: Aug. 11, 2020

(54) ARRANGEMENT FOR CHOOSING TRANSCEIVER NODES IN A MOBILE TELECOMMUNICATIONS NETWORK

(71) Applicant: VODAFONE IP LICENSING LIMITED, Newbury, Berkshire (GB)

(72) Inventors: Federico Boccardi, London (GB); Ilaria Thibault, London (GB); Hisham Elshaer, London (GB); Eric Albert Bouton, London (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 194 days.

(21) Appl. No.: 15/307,664

(22) PCT Filed: Apr. 30, 2015

(86) PCT No.: PCT/GB2015/051259
§ 371 (c)(1),
(2) Date: Oct. 28, 2016

(87) PCT Pub. No.: WO2015/166249
PCT Pub. Date: Nov. 5, 2015

(65) Prior Publication Data
US 2017/0055224 A1  Feb. 23, 2017

(30) Foreign Application Priority Data

May 1, 2014 (GB) .................................. 1407726.7
Oct. 1, 2014 (GB) .................................. 1417366.0
Nov. 12, 2014 (GB) .................................. 1420131.3

(51) Int. Cl.
H04W 52/14 (2009.01)
H04W 28/08 (2009.01)
(Continued)

(52) U.S. Cl.
CPC ....... *H04W 52/146* (2013.01); *H04L 43/0829* (2013.01); *H04W 24/08* (2013.01);
(Continued)

(58) Field of Classification Search
USPC ......................................................... 370/230
See application file for complete search history.

(56) References Cited

U.S. PATENT DOCUMENTS 5,487,174 A  1/1996  Persson
8,243,679 B1  8/2012  Hunag et al.
(Continued)

FOREIGN PATENT DOCUMENTS

CN  102421153 A  4/2012
EP  0892570  1/1999
(Continued)

OTHER PUBLICATIONS

International Search Report for PCT/GB2015/051259 dated Oct. 22, 2015.
(Continued)

Primary Examiner — Gregory B Sefcheck
Assistant Examiner — Majid Esmaeilian
(74) Attorney, Agent, or Firm — Workman Nydegger

(57) ABSTRACT

A mobile telecommunications network includes a mobile telecommunications device (1), a plurality of transceiver nodes (5), and control means (21) operable to choose at least one of the transceiver nodes for use by the mobile telecommunications device for uplink communications and to choose at least one of the transceiver nodes for use by the mobile telecommunications device for downlink communications. The control means is operable to choose the at least one of the transceiver nodes for use by the mobile telecommunications device for uplink communications based upon at least one criterion that is independent of received signal
(Continued)

power/path loss, such as: the number of the transceiver node antennas; the antenna gain of the or each of the transceiver node antennas; the maximum uplink transmit power allowed by the transceiver node from the mobile telecommunications device; the load of the transceiver node; the backhaul capacity of the transceiver node; and/or the interference level in the uplink to the transceiver node from the mobile telecommunications device. Arrangement for reducing interference is situations where mobile telecommunications devices engage in Device-to-Device (D2D) communication are also described.

19 Claims, 8 Drawing Sheets

(51) Int. Cl.
  *H04W 36/20* (2009.01)
  *H04L 12/26* (2006.01)
  *H04W 24/08* (2009.01)
  *H04W 40/12* (2009.01)
  *H04W 48/20* (2009.01)
  *H04W 52/36* (2009.01)
  *H04W 48/16* (2009.01)
  *H04W 84/04* (2009.01)

(52) U.S. Cl.
  CPC .......... *H04W 28/08* (2013.01); *H04W 36/20* (2013.01); *H04W 40/12* (2013.01); *H04W 48/20* (2013.01); *H04W 52/36* (2013.01); *H04W 48/16* (2013.01); *H04W 84/045* (2013.01); *Y02D 70/1222* (2018.01); *Y02D 70/1242* (2018.01); *Y02D 70/1262* (2018.01); *Y02D 70/142* (2018.01); *Y02D 70/21* (2018.01)

(56) References Cited

U.S. PATENT DOCUMENTS

| | | | |
|---|---|---|---|
| 8,358,624 B1 | 1/2013 | Ghaus et al. | |
| 2010/0216470 A1 | 8/2010 | Pamp et al. | |
| 2010/0311435 A1 | 12/2010 | Mueck et al. | |
| 2012/0329503 A1* | 12/2012 | Jongren | H04W 52/10 455/509 |
| 2013/0033115 A1 | 2/2013 | Cutler et al. | |
| 2013/0089034 A1 | 4/2013 | Acharya et al. | |
| 2013/0163441 A1* | 6/2013 | Verma | H04W 72/02 370/248 |
| 2014/0113677 A1* | 4/2014 | Parkvall | H04W 52/146 455/522 |
| 2014/0295834 A1 | 10/2014 | Lee et al. | |
| 2016/0029333 A1* | 1/2016 | Seo | H04L 27/2655 370/350 |
| 2016/0192376 A1* | 6/2016 | Lee | H04W 72/0406 370/252 |

FOREIGN PATENT DOCUMENTS

| | | |
|---|---|---|
| EP | 0892570 A2 | 1/1999 |
| EP | 2 337 404 A1 | 6/2011 |
| EP | 2367397 | 9/2011 |
| EP | 2367397 A1 | 9/2011 |
| EP | 2 571 315 A1 | 3/2013 |
| EP | 2 882 229 A1 | 6/2015 |
| GB | 2475851 A1 | 6/2011 |
| WO | 2008-156246 | 12/2008 |
| WO | WO2008/156246 A1 | 12/2008 |
| WO | WO 2009/020414 A1 | 2/2009 |
| WO | WO 2011/109027 A1 | 9/2011 |
| WO | WO 2013/100831 A1 | 7/2013 |
| WO | WO 2013/166371 A1 | 11/2013 |
| WO | WO2013/191460 A1 | 12/2013 |
| WO | WO 2014/021563 A1 | 2/2014 |
| WO | 2014-059666 | 4/2014 |
| WO | WO2014/067028 A1 | 5/2014 |
| WO | WO2015/021318 A2 | 2/2015 |

OTHER PUBLICATIONS

"3rd Generation Partnership Project; Technical Specification Group Radio Access Network; Study on UMTS heterogeneous networks (Release 12)", 3GPP Draft; 25800-C10, 3rd Generation Partnership Project (3GPP), Mobile Competence Centre ; 650, Route Des Lucioles; F-06921 Sophia-Antipolis Cedex ; France 9 Dec. 20, 2013 (Dec. 20, 2013), XP050916582, Retrieved from the Internet: URL:http://www.3gpp.org/ftp/Specs/zltuInfo /M.2012-2/2014-12/Re1-12/25 series/ [retrieved on Dec. 20, 2013] paragraph [06.1]—paragraph [6.1.5] paragraph [7.1.1]—paragraph [7.1.3] Paragraphs [7.1.3.6.1], [7.1.3.6.2].

Intellectual Property Office Search Report for GB1407726.7 dated Aug. 13, 2014.

Intellectual Property Office Search Report for GB1417366.0 dated Feb. 25, 2015.

Intellectual Property Office Search Report for GB1420131.3 dated Apr. 14, 2015.

Intellectual Property Office Search Report for GB1420131.3 dated Jul. 8, 2015.

European Examination Report for EP 15723549.0 dated May 17, 2019.

Huawei et al., "Text proposal for E-DCH decoupling for TS 25.300", 3GPP Draft; R2-141775 Text Proposal for E-DCH Decoupling for TS 25.300, 3rd Generation Partnership Project (3GPP), Mobile Competence Centre; 650, Route des Lucioules; F-06921 Sophia-Antipolis Cedex; vol. Ran WG2, No. Valencia, Spain; 20140331-20140404 Apr. 4, 2014 (Apr. 4, 2014), XP050792926, Retrieved from the Internet: URL: <http://www.3gpp.org/ftp/Meetings_3GPP_SYNC/RAN2/Docs/> ,[retrieved on Apr. 4, 2014], pp. 1-3.

Examination Report for GB 1407726.7 dated Mar. 13, 2020.
Examination Report for GB 1417366.0 dated Mar. 13, 2020.

* cited by examiner

ARRANGEMENT FOR CHOOSING
TRANSCEIVER NODES IN A MOBILE
TELECOMMUNICATIONS NETWORK

CROSS REFERENCE TO RELATED
APPLICATIONS

This application is a U.S. Nationalization of PCT Application Number PCT/GB2015/051259, filed on Apr. 30, 2015, which claims priority to GB Patent Application No. 1407726.7 filed on May 1, 2014, and GB Patent Application No. 1417366.0 filed on Oct. 1, 2014, and GB Patent Application No. 1420131.3, filed on Nov. 12, 2014, the entireties of which are incorporated herein by reference.

TECHNICAL FIELD

The invention relates to a mobile telecommunications network including a mobile telecommunications device, a plurality of transceiver nodes, and control means operable to choose at least one of the transceiver nodes for use by the mobile telecommunications device for uplink communications and to choose at least one of the transceiver nodes for use by the mobile telecommunications device for downlink communications. The invention also relates to a corresponding method.

BACKGROUND TO THE INVENTION

In a telecommunications network (e.g., mobile/cellular network), user equipment (UE—e.g., mobile/cellular telephone, mobile device, etc.) establishes a communication link with a transceiver node (e.g., base station, cell site, BTS, NodeB, eNodeB, access point, access node, femto cell, pico cell). This communication link allows transmission of data from the UE to the transceiver node (uplink, UL) and, also, reception of data from the transceiver node to the UE (downlink, DL).

Standard-setting bodies within various telecommunications industries, such as ETSI, have promulgated standards for how user equipment (UE) is required to uplink (UL) and downlink (DL) to transceiver nodes. These standards require the user equipment to UL and DL with the same transceiver node. Thus, when the UE migrates out of range from one transceiver node and into range of another transceiver node, the standards require simultaneous handoff/handover or reselection of both the UL and DL from one transceiver node to another. This simultaneous transfer of both the UL and DL has some disadvantages.

Transceiver node selection in conventional cellular networks is based on the DL signal level only, where a UE in idle mode measures the received signal power from different transceiver nodes and a transceiver node selection decision is taken based on the strongest received signal power.

This approach is adequate in homogeneous networks composed of Macro transceiver nodes (e.g., MeNB). However, the introduction of heterogeneous networks (HetNets) composed of MeNBs and small transceiver nodes (e.g., SeNBs) makes the transceiver cell node selection based on the DL received power very inefficient in terms of the UL.

DL coverage is based on the transmission power of a transceiver node. SeNBs have a much smaller coverage area than MeNBs because they tend to have a much lower transmission power. However, UL coverage depends on the terminal transmission power which is more or less the same whether the terminal is transmitting to a SeNB or MeNB. This fact creates an imbalance in the UL and DL coverage in a HetNet scenario.

The imbalance problem also causes high interference scenarios where MeNB UEs cause high interference to the SeNB UEs when these MeNB UEs are very close to (or in) the coverage area of the SeNBs. This interference can more severely affect UEs engaging in Device-to-Device (D2D) communication, when the D2D connection is in band and is using the UL cellular resources (as e.g. in Rel-12 LTE D2D, which is fully incorporated herein by reference). If we have two devices communicating in a D2D fashion in a SeNB, a MeNB UE that is very close to the SeNB coverage could cause a high level of interference to the D2D couple because the interference is received at the devices and not at the SeNB/Scell as in a typical cellular connection. Also, if we assume a scenario where two devices covered by a MeNB are communicating in a D2D fashion and are located near the cell edge of a MeNB, UEs covered by a SeNB located close to the same (above-mentioned) cell edge would both perceive and inflict a high level of interference from the D2D pair. This happens because both D2D UEs and cellular UEs are power controlled in the uplink based on their pathloss to their serving eNB. When UEs are covered by the same eNB, they are scheduled in a manner so as not to cause interference at the receiving eNB. However, when they are covered by different cells that are nor synchronised or coordinated, avoiding (or mitigating) interference is not possible. As mentioned above, this issue is even more pronounced when the interference is perceived by neighbouring (e.g. D2D) UEs.

Also, cell loads in UL and DL are different in terms of volume where the DL load is generally much larger than the UL (a DL:UL ratio of 80:20 has been observed). The DL and UL volumes are not necessarily dependent, meaning that a cell or a UE having high UL traffic volume does not necessarily have high DL traffic volume too. In fact mostly the UL and DL traffic volumes are independent.

A known proposed solution to this imbalance problem is to decouple UL and DL transceiver node association, where DL transceiver node association is based on the DL received power whereas UL transceiver node association is based on path loss.

US20130163441A1 discloses decoupling downlinks and uplinks between UEs and transceiver nodes. The transceiver node for the DL connection with the UE is determined as a function of DL signal strength. The transceiver node for the UL connection with the UE is determined as a function of path loss. Determining path loss is performed by subtracting a measured signal strength at the UE from the transmit power of each transceiver node. The path loss for each transceiver node is then used as a proxy for UL signal strength, and the UL signal strength is then used as a basis for determining which transceiver node is optimal for UL from the UE. In other words, a processor within the UE determines the DL signal strength and also the received signal strength, and then calculates the path loss as a function of the DL signal strength and the received signal strength. An optimal UL transceiver node is then determined as a function of the path loss.

US20130089034A1 discloses an arrangement in which a UE can associate with different transceiver nodes for its UL and DL communications. To achieve this, the two transceiver nodes communicate with each other. A signalling methodology within a cellular standards framework (such as LTE) is disclosed, by which a UE can associate with a different transceiver node for UL and DL communications and further facilitate communication between a transceiver node handling UL and a transceiver node handling DL. The selection of a transceiver node by sending a Sounding Reference Signal (SRS), which allows a received power value to be determined, is disclosed. The applicability to heterogeneous networks, where different transceiver nodes can have different transmit powers, is discussed.

U.S. Pat. No. 8,824,326 B2 ("Method and apparatus for managing device-to-device interference") discusses interference management for D2D by sensing interference on the resources and trying to schedule the D2D communication on resources that have a low interference level. This prior art document is in the context of a 'traditional' telecommunications network, i.e. the UE is connected to the same cell in UL and in DL. Accordingly, the prior art does not solve the problem of D2D interference management in a decoupled UL/DL telecommunications network.

US 20120051315 A1 ("Method and Apparatus for Managing Device-to-Device Interference") also relates to interference and proposes to solve interference issues by scheduling D2D on resources that are less interfered. This prior art document is also in the context of a 'traditional' telecommunications network, i.e. the UE is connected to the same cell in UL and in DL. Accordingly, the prior art does also not solve the problem of D2D interference management in a decoupled UL/DL telecommunications network.

SUMMARY OF THE INVENTION

In one aspect the present invention provides a mobile telecommunications network including at least one mobile telecommunications device, a plurality of transceiver nodes, and control means operable to choose at least one of the transceiver nodes for use by the mobile telecommunications device for uplink communications and to choose at least one of the transceiver nodes for use by the mobile telecommunications device for downlink communications, wherein the control means is operable to choose the at least one of the transceiver nodes for use by the mobile telecommunications device for the uplink communications based upon at least one criterion that is independent of received signal power.

In the embodiments the received signal power is the received signal power at the mobile telecommunications device from the at least one of the transceiver nodes for the uplink communications.

The plurality of transceiver nodes may comprise nodes of at least two types: a first type (MeNB) having relatively large transmission power/coverage area and a second type (SeNB) having a relatively small transmission power/coverage area. The first type may be a macro base station. The second type may be a type of non-marco base station, such as a pico, femto or micro base station—or any type of transceiver node that has a significantly lower transmission power capability than a conventional macro base station.

The term "transceiver node" may include any node that allows wireless connection of a UE to the network, and includes a base station, cell site, BTS, NodeB, eNodeB, access point, access node, femto cell and pico cell, as well as the MeNBs and SeNBs mentioned in the embodiment. The invention is not limited to a network that comprises transceiver nodes that operate at different maximum powers (such as MeNBs and SeNBs).

The received signal power in the embodiments in relation to a mobile telecommunications device and a particular transceiver node is the power of the signal from the transceiver node as received at the mobile telecommunications device, and may be the RSRP.

In the embodiments the at least one criterion that is independent of received signal power is independent of path loss. In the embodiments the path loss is the path loss at the mobile telecommunications device from the at least one of the transceiver nodes for the uplink communications. Path loss is derived from received signal power as follows: path loss=transceiver node transmit power−received signal power (e.g. RSRP).

In some embodiments the control means is operable to choose the at least one of the transceiver nodes for use by the mobile telecommunications device for the uplink communications without requiring the transmission of data from the mobile telecommunications device to any of the plurality of transceiver nodes.

In some embodiments the control means is operable to choose the at least one of the transceiver nodes for use by the mobile telecommunications device for the uplink communications while the mobile telecommunications device is in an idle communication state (e.g., when a UE is camped on a transceiver node but does not have an RRC connection to it). In the idle state the UE may perform cell selection or reselection as the UE moves within the mobile telecommunications network and attaches to different transceiver nodes. The advantages of defining the UL and DL transceiver nodes when the UE is in idle mode, and not in connected mode, are:

1. The Uplink is—in general—coverage limited since it depends on the transmit power of the UE which is much lower than the transmit power of a transceiver node. If a UE tries to connect to its serving transceiver node (the optimal transceiver node from a DL perspective) with an initial message (e.g. Random access request) the UE might not be able to reach the transceiver node due to its limited power but, if the UE knows already its optimal UL transceiver node (e.g. based on path loss), it will not have this limitation when trying to connect to it.
2. If a UE tries to find its optimal UL transceiver node by using SRS (as done in US20130089034A1) which requires that the UE is in connected mode, this is inefficient in the sense that the UE needs to send unnecessary information (the SRS) which affects the limited battery of the UE and also the UE has to be establish an UL connection to the wrong transceiver node first in order to find the correct one, which would add a delay and increase the amount of data the UE has to transmit.

Path loss (or path attenuation) is the reduction in power density (attenuation) of an electromagnetic wave as it propagates through space. Path loss may be due to many effects, such as free-space loss, refraction, diffraction, reflection, aperture-medium coupling loss, and absorption. Path loss is also influenced by terrain contours, environment (urban or rural, vegetation and foliage), propagation medium (dry or moist air), the distance between the transmitter and the receiver, and the height and location of antennas. In this context the term "path loss" has the conventional meaning used in relation to cellular telecommunications. That is, the term refers to a value that depends on the actual path loss and but also the antenna gain. An alternative term for path loss is "coupling loss", although the term "path loss" is used hereinafter. One way of calculating the path loss in a mobile telecommunications network is to subtract the received signal power from the eNB transmit power (path_loss=eNB transmit power−RSRP).

In some embodiments the control means is provided in the mobile telecommunications device, but may be provided elsewhere. The control means may be provided at the transceiver node or the network core. The control means may be split between several elements of the mobile telecommunications network. In the embodiments the control means is provided in the mobile telecommunications device and the choosing of a transceiver node is performed by the mobile telecommunications device (by the control means thereof).

The control means may choose more than one transceiver node for use by the mobile telecommunications device for uplink communications. The control means may choose more than one transceiver node for use by the mobile telecommunications device for downlink communications.

The transceiver node(s) chosen for the uplink and downlink will often be different, but sometimes the same transceiver node(s) will be used for both uplink and downlink The control means may also be operable to choose the at least one of the transceiver nodes for use by the mobile telecommunications device for uplink communications based upon a criterion that does include received signal power and/or path loss.

The control means may be operable to choose the at least one of the transceiver nodes for use by the mobile telecommunications device for uplink communications based upon a criterion that includes SINR (signal-to-interference-plus-noise ratio).

The at least one criterion that is independent of received signal power may include a characteristic of the transceiver node.

The characteristic of the transceiver node may include the configuration of transceiver node antenna(s) for the cell, such as the number of the transceiver node and/or the antenna gain of the or each of the transceiver node antennas.

The characteristic of the transceiver node may include the maximum uplink transmit power allowed from the mobile telecommunications device.

The characteristic of the transceiver node may include the load thereof (e.g. the load in the relevant transceiver node, or the backhaul load). Including the load in the UL cell association decision may improve the throughput and outage compared to only basing cell association on the pathloss since including the load improves the load balancing effect and may avoid cell outages.

The characteristic of the transceiver node may include the backhaul capacity thereof (e.g. the maximum data rate possible in the backhaul link). The backhaul may comprise the link between the core network and the transceiver node. The backhaul capacity may depend on the nature of the link. For example, a microwave link may have a lower capacity that a fixed (cable) link.

The characteristic of the transceiver node may include the interference level in the uplink to the transceiver node from the mobile telecommunications device.

The at least one criterion that is independent of received signal power may be one or more criterion selected from the group consisting of:
   the number of the transceiver node antennas;
   the antenna gain of the or each of the transceiver node antennas;
   the maximum uplink transmit power allowed by the transceiver node from the mobile telecommunications device;
   the load of the transceiver node;
   the backhaul capacity; and
   the interference level in the uplink to the transceiver node from the mobile telecommunications device.

In embodiments the control means is operable to choose the at least one of the transceiver nodes for use by the mobile telecommunications device for the uplink communications based upon at least one criterion that is independent of received signal power, and wherein the control means is further operable to choose the at least one of the transceiver nodes for use by the mobile telecommunications device for uplink communications based upon a criterion that includes received signal power by:
   calculating a value that is derived from the received signal power and that is adjusted in dependence upon at least one of:
      the number of the transceiver node antennas;
      the antenna gain of the or each of the transceiver node antennas;
      the maximum uplink transmit power allowed by the transceiver node from the mobile telecommunications device;
      the load of the transceiver node;
      the backhaul capacity; and
      the interference level in the uplink to the transceiver node from the mobile telecommunications device; and
   using the adjusted value to choose the at least one of the transceiver nodes for use by the mobile telecommunications device for uplink communications.

The criterion that includes received signal power in the first embodiment is path loss. The value that is derived from the received signal power and that is adjusted is path loss. In the procedure in the preceding paragraph, the path loss from each transceiver node is weighted based on the other criteria. The weighted path loss values can then be used to make an improved transceiver node selection, in contrast to selection based on or path loss alone.

The present invention also provides a corresponding method.

The embodiments describe a new transceiver node association mechanism as part of a telecommunications network where uplink (UL) and downlink (DL) have been decoupled.

The first embodiment facilitates user equipment (UE) to connect in the UL to the optimum transceiver node in terms of pathloss, transceiver node antenna configuration, load and interference conditions as determined by applying a weighting factor to each of the aforementioned criteria/parameters when run through an algorithm.

This procedure is advantageous over the current art, where UL selection is essentially determined by DL transceiver node selection (DL transceiver node selection is based upon received transmission power at the UE). In a heterogeneous network (i.e. a network comprised of many macro and small eNBs) basing UL transceiver node selection in terms of received power is not optimal due to the large number of factors affecting UL in a HetNet environment, e.g. number of and type of antenna at macro eNB and small eNB.

In a further aspect, the present invention provides a mobile telecommunications network including a mobile telecommunications device, a plurality of transceiver nodes, and control means operable to choose at least one of the transceiver nodes for use by the mobile telecommunications device for uplink communications and to choose at least one of the transceiver nodes for use by the mobile telecommunications device for downlink communications, wherein the control means is operable to choose the at least one of the transceiver nodes for use by the mobile telecommunications device for the uplink communications based upon at least one criterion that is independent of path loss.

In a yet a further aspect, the present invention provides a mobile telecommunications network including a mobile telecommunications device, a plurality of transceiver nodes, and control means operable to choose at least one of the transceiver nodes for use by the mobile telecommunications device for uplink communications and to choose at least one of the transceiver nodes for use by the mobile telecommunications device for downlink communications, wherein the control means is operable to choose the at least one of the transceiver nodes for use by the mobile telecommunications device for the uplink communications based at least partially upon a backhaul capacity the transceiver node.

In the third and fourth embodiments the at least one criterion that is independent of received signal power includes a characteristic of a neighbouring one of the transceiver nodes, different to the at least one of the transceiver nodes for the uplink communications. Preferably, the characteristic of the neighbouring one of the transceiver nodes includes the received signal power therefrom at the mobile telecommunications device, and e.g. includes the path loss therefrom at the mobile telecommunications device.

In third and fourth embodiments the at least one criterion that is independent of received signal power includes a characteristic of a neighbouring one of the transceiver nodes, different to the at least one of the transceiver nodes for the uplink communications. The characteristic of the neighbouring one of the transceiver nodes may include the received signal power therefrom at the mobile telecommunications device and may be path loss therefrom at the mobile telecommunications device.

In third and fourth embodiments the control means may be operable to choose the at least one of the transceiver nodes for use by the mobile telecommunications device for the uplink communications in dependence upon the path loss (PL_MeNB) from the neighbouring one of the transceiver nodes at the mobile telecommunications device and path loss (PL_SeNB) from the at least one of the transceiver nodes at the mobile telecommunications device.

In third and fourth embodiments the control means may be operable to choose the at least one of the transceiver nodes for use by the mobile telecommunications device for the uplink communications in dependence upon path loss difference (PL_diff) between the path loss (PL_MeNB) from the neighbouring one of the transceiver nodes at the mobile telecommunications device and the path loss (PL_SeNB) from the at least one of the transceiver nodes at the mobile telecommunications device.

In third and fourth embodiments the control means may be operable to choose the at least one of the transceiver nodes for use by the mobile telecommunications device for the uplink communications if path loss difference (PL_diff) exceeds a threshold.

In the third embodiment the control means may be operable to choose the at least one of the transceiver nodes for use by the mobile telecommunications device for the uplink communications in response to interference detected by mobile telecommunications devices that are attached to the at least one of the transceiver nodes and that are configured to perform (in-band) device-to-device (D2D) communication (using the UL cellular resources of the network) therebetween—for example in accordance with Rel-12 LTE D2D.

In the third embodiment the control means may be operable to choose the at least one of the transceiver nodes for use by the mobile telecommunications device for the uplink communications in response to a distance between the said mobile telecommunications device and the mobile telecommunications devices that are attached to the at least one of the transceiver nodes being below a threshold.

The third embodiment may mitigate inter-cell interference arising during D2D communication between UE which are nearby an adjacent cell in a UL/DL decoupled telecommunications network, by handing over the interfering UE in UL to the same cell serving the D2D couple based upon the UEs own interference calculation or as measured by the serving cell. If the calculation determines hand over is not appropriate, the serving cells inform the interfering UE and the D2D couple to reduce their transmit power.

In the fourth embodiment the at least one mobile telecommunications device comprises mobile a plurality of mobile telecommunications devices that are configured to perform (in-band) device-to-device communication (using the UL cellular resources of the network) therebetween—for example in accordance with Rel-12 LTE D2D.

In the fourth embodiment the control means may be operable to choose the at least one of the transceiver nodes for use by the mobile telecommunications device for the uplink communications in response to interference detected by the plurality of mobile telecommunications devices that are configured to perform device-to-device communication therebetween.

In the fourth embodiment the control means may be operable to choose the at least one of the transceiver nodes for use by the mobile telecommunications device for the uplink communications in response to interference detected by a mobile telecommunications device that is attached to the at least one of the transceiver nodes.

In a further aspect, the present invention provides a mobile telecommunications network including a plurality of mobile telecommunications devices, at least one of which is configured for device-to-device (D2D) communication (for example in accordance with Rel-12 LTE D2D), a plurality of transceiver nodes, and control means operable to choose at least one of the transceiver nodes for use by a one of the mobile telecommunications device for uplink communications and to choose at least one of the transceiver nodes for use by the mobile telecommunications device for downlink communications, wherein the control means is operable to choose the at least one of the transceiver nodes for use by the mobile telecommunications device for the uplink communications based upon at least one criterion that is independent of received signal power at the mobile telecommunications device from the at least one of the transceiver nodes for the uplink communications.

BRIEF DESCRIPTION OF THE DRAWINGS

For a better understanding of the present invention embodiments will now be described by way of example, with reference to the accompanying drawings, in which.

DETAILED DESCRIPTION OF EMBODIMENT OF THE INVENTION

Overview of SAE/LTE Network

Figure 1:
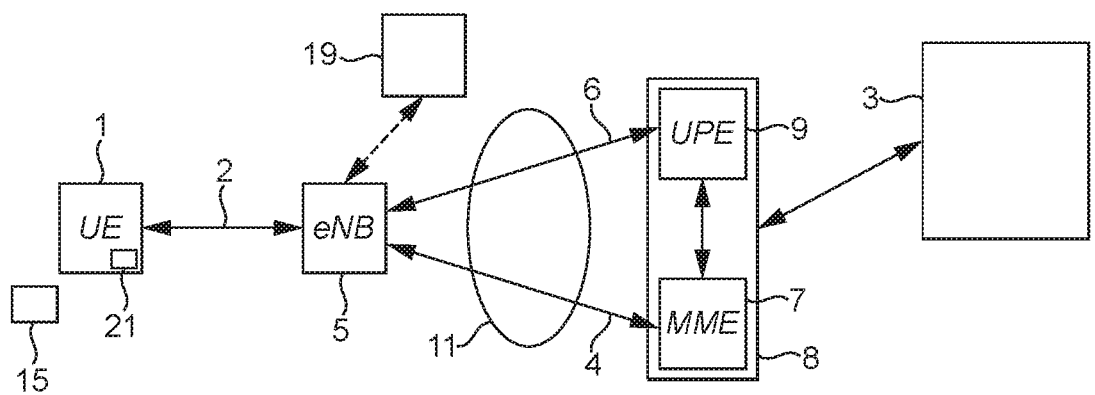
FIG. 1 shows the main elements of an SAE/LTE 4G network.

FIG. 1 shows schematically the logical elements of a SAE/LTE cellular telecommunications network. Mobile terminal (UE) 1 is registered with mobile telecommunications network core 3. The mobile terminal 1 may be a handheld mobile telephone, a personal digital assistant (PDA) or a laptop or desktop personal computer—for example, equipped with a wireless datacard. The device 1 communicates wirelessly with the mobile telecommunications network core 3 via the radio access network (RAN) of the mobile telecommunications network core 3 over radio interface 2. The RAN comprises a transceiver node (base station), an eNodeB (or eNB) 5 in this example. An eNodeB 5 performs functions generally similar to those performed by the NodeB and the radio network controller (RNC) of a 3G network. In practice there will be a multiplicity of eNodeBs 5, each serving a particular area or "cells". Each eNodeB is coupled to one or more antenna devices. The eNodeB and antenna device form a cell site. The cell site provides radio coverage to a plurality of cells, e.g. three.

Signalling in a mobile telecommunications network can be considered to be separated into "control plane" signalling and "user plane signalling". The control plane performs the required signalling, and includes the relevant application protocol and signalling bearer for transporting the application protocol messages. Among other things, the application protocol is used for setting up the radio access bearer and the radio network layer. The user plane transmits data traffic and includes data streams and data bearers for the data streams. The data streams are characterised by one or more frame protocols specific for a particular interface. Generally speaking, the user plane carries data for use by a receiving terminal—such as data that allow a voice or picture to be reproduced—and the control plane controls how data are transmitted. A Packet Data Network Gateway (PDN-GW) terminates the user plane within the core 3.

A PDP (packet data protocol) context defines parameters that support the flow of data traffic to and from a mobile terminal. Among the parameters that are set are the identifier of the external packet data network with which the terminal wishes to communicate, a PDP address recognised in that network (for example, the IP address allocated to the mobile terminal), the address of the network gateway, quality of service (QoS) parameters etc.

A mobility management entity (MME) 7 provides equivalent functions to the control plane functions of the SGSN and GGSN from the 3G architecture (Release-6). The MME handles security key management. The MME also provides control plane function for mobility between LTE and GSM/UMTS networks. Communications between the eNodeB 5 are transmitted to the MME 7 via the S1-c Interface 4.

A user plane entity (UPE) 9 handles the user plane traffic functions from the terminal 1 which includes the IP header and payload compression and ciphering. This UPE 9 provides the equivalent functions to the user plane part of the 3 RNC and the user plane part of the 3G GGSN. Communications between the eNodeB 5 are transmitted to the UPE 7 via the S1-u Interface 6. The known 3GPP authentication procedure may be re-used in the SAE/LTE architecture shown, between the terminal 1/UE and the MME 7.

It should be noted that, although in FIG. 1 the MME 7 and UPE 9 are shown as separate logical entities they may exist as a single physical node of the telecommunications network in gateway aGW 8.

Data are transmitted between the eNodeB 5 and the MME 7 and UPE 9 via the IP transport network 11.

The backhaul from the eNB 5 may comprise any or all of the links providing the S1-c Interface 4, the S1-u Interface 6 and the connection between the gateway aGW 8 and the mobile telecommunications network core 3.

Although only one mobile terminal 1 is shown, there will in practice be a multiplicity of mobile terminals, each of which is registered with the network core 3. Each mobile terminal (including mobile terminal 1) is provided with a respective subscriber identity module (SIM) 15. During the manufacturing process of each SIM, authentication information is stored thereon under the control of the mobile telecommunications network core 3. The mobile telecommunications network core 3 itself stores details of each of the SIMs issued under its control. In operation of the mobile telecommunications network core 3, a terminal 1 is authenticated by a SIM 15.

The network also performs O&M (Operations & Maintenance). This term refers to the processes and functions used in managing a network or element within a network.

Mobile telecommunications networks have an active state of communication with their mobile terminals and an inactive/idle state of communication with their terminals. When in the active state, as the mobile terminals move between different transceiver nodes of the network, the communication session is maintained by performing a "handover" operation between the transceiver nodes. In the inactive/idle state, as a mobile terminal moves between different transceiver nodes of the network the mobile terminal performs "cell reselection" to select the most appropriate transceiver node on which to "camp" in order that the mobile terminal can be paged by the network when mobile terminating data is destined for that mobile terminal.

Typically a UE will report the following measurements to the network: CQI, serving transceiver node RSRP and neighbour transceiver node RSRP.

Reference Signal Receive Power, RSRP, is a measurement (in dBm) made by the UE of a reference signal transmitted from a transceiver node. A higher RSRP value indicates a higher received signal power. UEs measure RSRP values for the serving transceiver node (i.e. the transceiver node on which they are currently camped) and neighbouring transceiver nodes. The RSRP values measured by each UE may be transmitted to its serving transceiver node.

The RSRP value for a particular transceiver node, as measured by UE, is very generally inversely proportional to the distance of that UE from the eNodeB. That is, a UE close to the eNodeB will have a relatively high RSRP value, and a UE further from the eNodeB will have a relatively low RSRP value. As will be known to those skilled in the art, the RSRP value is not solely proportional to distance, but will also be affected by other factors, such as obstructions to the radio signal path between the UE and the eNodeB. As mentioned above, in a HetNet, some transceiver nodes may operate at different power levels—and this will affect the RSRP.

CQI, Channel Quality Indicator, is used by the mobile device to indicate the channel quality to the eNodeB. The CQI reported value is between 0 and 15.

Conventionally, the mobile terminal or network determines whether a handover/cell reselection procedure should be triggered in dependence upon measurements of the radio signals (e.g. RSRP) of the transceiver nodes in the region of the mobile terminal. A filter is applied to the signals (either by the network or by the mobile terminal) which calculates an average (e.g. arithmetical mean) value of these signals over a particular time period. These filtered/average values of the transceiver nodes are then compared with each other or with a threshold value. In dependence upon these comparisons, cell reselection/handover related procedures are triggered. This cell reselection/handover process generally comprises taking radio signal measurements of neighbouring transceiver nodes and comparing these to each other and to the radio signal of the current transceiver node to determine which transceiver node provides the best signal strength/quality. Handover/reselection to the best transceiver node can then occur.

Generally calculations to determine whether to perform a handover from one transceiver node to another transceiver node are performed by the network, whereas calculations whether to perform cell reselection are performed by the mobile terminal.

According to the LTE Specifications, an eNodeB may be provided with a multiple-input multiple-output (MIMO) system with up to four transmit antennae per transceiver node. Similarly, the LTE mobile terminals may be provided with up to four receive antennae.

An operator is typically allocated a frequency band of, for example, 20 MHz, divided into groups of 180 KHz. In each of these groups there are 12 sub-carriers. Each eNodeB can measure the uplink receive power on each of the sub-carriers. This is not necessarily done in LTE. However, the principle is known from GSM.

Data are transmitted in the DL (i.e. in the direction from eNodeB to mobile terminal) by orthogonal frequency division multiple access (OFDMA). According to OFDMA the available frequency spectrum is divided into several sub-carriers. To maximise spectral efficiency, the frequency responses of the sub-carriers are overlapping the orthogonal. The OFDMA downlink transmissions and the UL transmissions (i.e. transmissions from a mobile terminal to an eNodeB) are organised into frames of 10 ms duration. This frame structure is applicable to frequency division duplex (FDD)—the use of frequency-division multiplexing to separate outward and return signals—and time division duplex (TDD)—the use of time-division multiplexing to separate outward and return signals.

Figure 2:
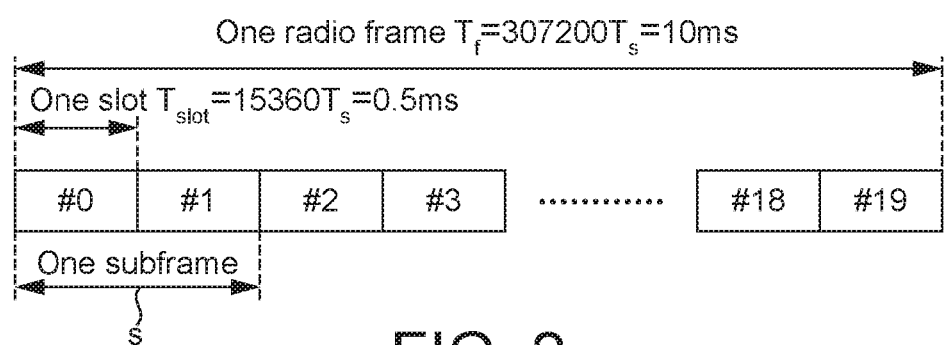
FIG. 2 shows the structure of an LTE FDD frame structure (Type 1)

As shown in FIG. 2, each frame consists of 20 slots (#0, #1, . . . , #19) of 0.5 ms. A sub-frame S is defined as two consecutive slots and therefore has a duration of 1 ms. For FDD, for a particular frame, 10 sub-frames are available for downlink transmissions and 10 sub-frames are available for uplink transmissions. The uplink and downlink transmissions are separated in the frequency domain. For TDD, a sub-frame is either allocated to downlink or uplink transmissions. However, the first and sixth sub-frame are always allocated for downlink transmissions.

Figure 3:
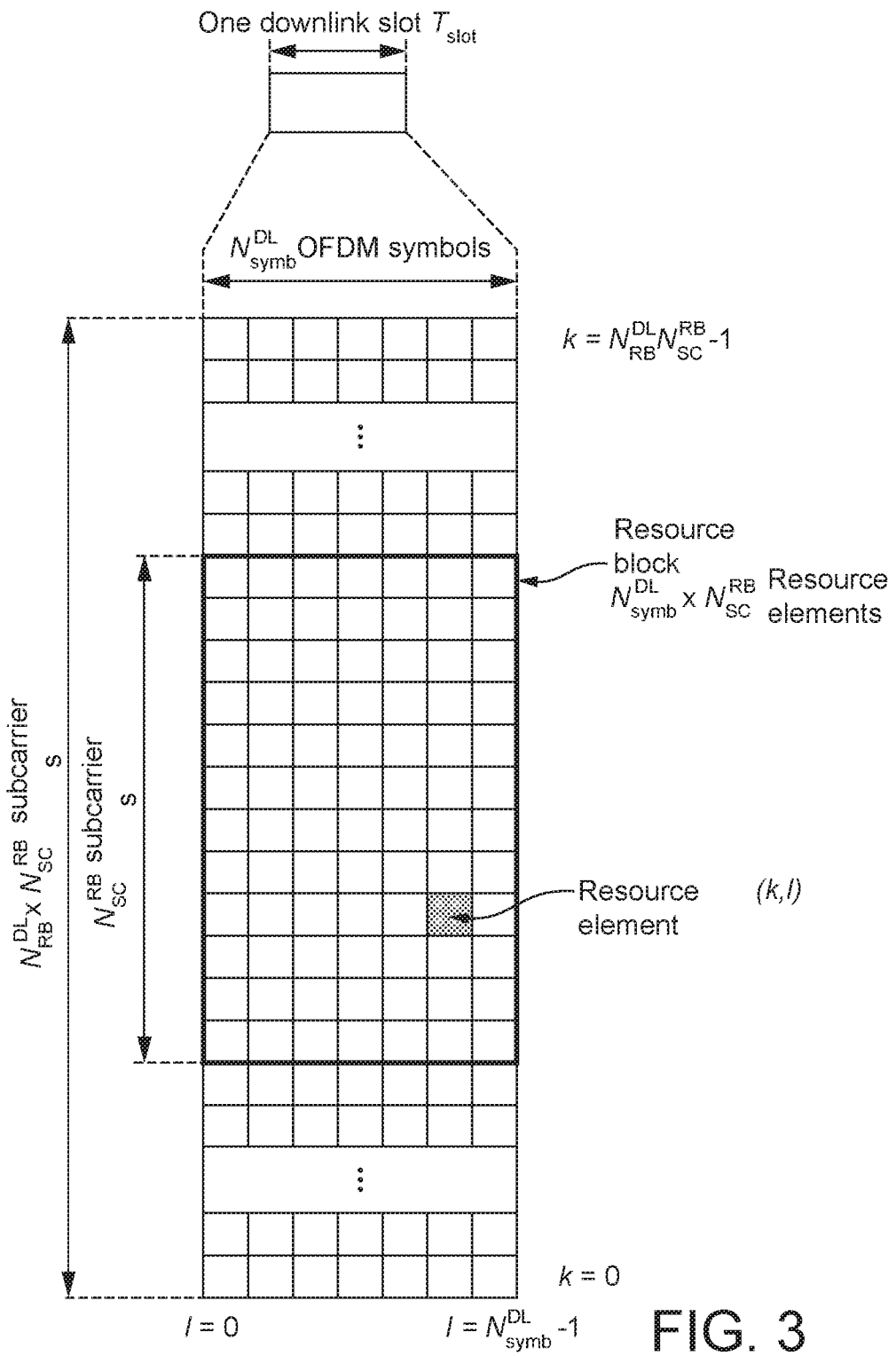
FIG. 3 shows in detail the structure of a downlink slot in the LTE for normal cyclic prefix.

As shown in FIG. 3, the FDD downlink signal of each slot can be defined by a resource grid of a predetermined number of sub-carriers (according to the bandwidth available) and a predetermined number of OFDMA symbols. For MIMO transmission there is one resource grid per antenna port. There are twelve consecutive sub-carriers per resource block (RB) in the frequency domain in FIG. 3.

Data is allocated to UEs in resource blocks (RBs) which in FIG. 3 consist of 12 consecutive sub-carriers in the frequency domain and 7 consecutive OFDM symbols. A resource block may consist of 12×7 resource elements (REs). Sub-carriers are grouped into subchannels (subchannels can be thought of an individual users). Sub-carriers in each subchannel are spread over the full channel spectrum to minimize multipath fading effects. These subchannels can be allocated "on-the-fly" as necessary to optimize the use of available bandwidth.

The Physical Downlink Shared Channel (PDSCH) is the main data bearing channel which is allocated to users on a dynamic and opportunistic basis. The PDSCH carries data in Transport Blocks (TB). They are passed from the MAC layer to the PHY layer once per Transmission Time Interval (TTI) which is 1 ms. Physical resources are assigned on a basis on two resource blocks for one TTI.

The PDCH is also used to transmit broadcast information not transmitted on the PBCH which include System Information Blocks (SIB) and paging messages.

During each TTI the eNB scheduler:
considers the physical radio environment per UE. The UEs report their perceived radio quality, as an input to the scheduler to decide which Modulation and Coding scheme (MCS) to use.
prioritise the QoS service requirements amongst the UEs.
inform the UEs of allocated radio resources. The eNB schedules the UEs both on the downlink and on the uplink. For each UE scheduled in a TTI the user data will be carried in a Transport Block (TB). The TB is delivered on a transport channel.

Each transceiver node transmits a reference signal (RS) in the downlink for each antenna port that is unique within the particular transceiver node, and therefore allows the transceiver node to be identified and which are used by the mobile terminals for channel estimation and physical measurements (such as signal strength and signal to noise ratio, average path loss and signal-to-interference ratio) collectively referred to as channel quality. The channel quality information is used, for example, to make handover and cell reselection decisions. In LTE the downlink reference signal is modulated into reference signals embedded within the resource blocks.

The measurements represented in the resource blocks are transmitted in the uplink back to the transceiver nodes from the mobile terminals.

Figure 4:
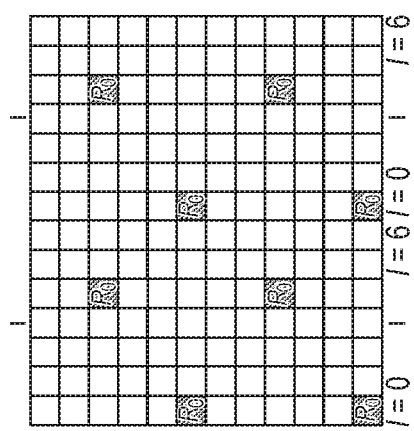
FIG. 4 shows the resource element mapping of reference signals in LTE for a MIMO antenna.
Figure 4:
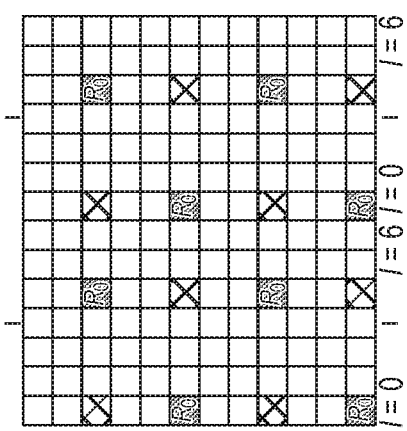
Figure 4:
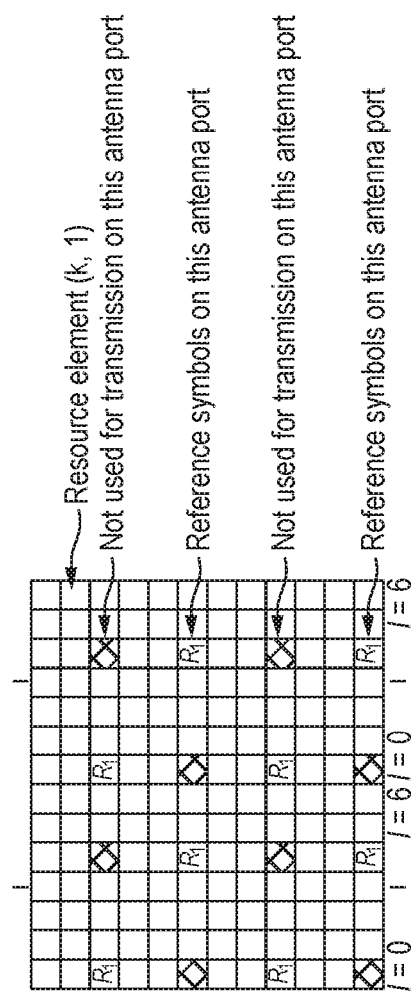
Figure 4:
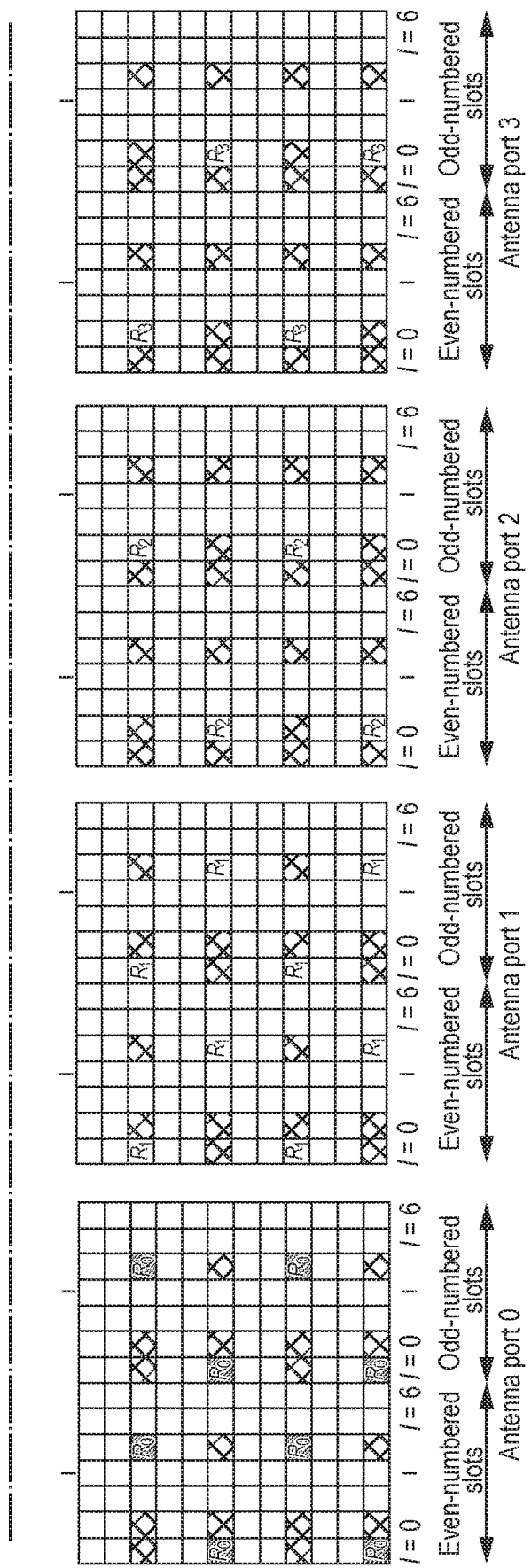

FIG. 4 shows how reference signals are embedded within the two slots of a subframe. In FIG. 4 the reference signals of the first antenna port are designated R0, the reference signals of the second antenna port are designated R1, the reference signals of the third antenna port are designated R2, and the reference signals of the fourth antenna port are designated R3. R0, R1, R2 and R3 are transmitted in each normal sub-frame of the radio frame, depending on the number of transceiver node specific antenna ports over the entire frequency band. It will be appreciated that the inclusion of reference signals within the resource block reduces the amount of data that can be transmitted. This overhead increases with number of antennas. On the other hand, reducing the number of reference signals reduces the channel estimation accuracy. The reference signals for R2 and R3 are not transmitted as frequently as reference signals for R0 and R1 in a subframe to reduce the overhead, and it is therefore more difficult to track fast channel variations. However, four antennae are used for low mobility terminals only, anyway.

The reference signals are transmitted on equally spaced subcarriers within the first, second and fifth (third from-last) OFDM symbol of each slot in a transceiver node with 4 antenna ports. For the UE to get an accurate Carrier to Interference Ratio (CIR) from each transmitting antenna, when a reference signals is transmitted from one antenna port, the other antenna ports in the transceiver node are idle. It should be noted that every symbol containing a reference signal also contains control/user data in other resource elements not occupied by the reference signal.

For Rel-8 LTE, the transceiver node sends reference signals in every 1 ms sub-frame. An LTE capable UE performs during each sub-frame normal channel estimation, CQI, measurements and mobility measurements based on this transceiver node specific reference signals RSeNB sent by the transceiver node in the DL frequency band. For LTE, CQI measurement may be on a sub-band basis (only a few sub-frames are used) or entire bandwidth is used. For smaller bandwidths (6-7 resource blocks, RBs) which corresponds to bandwidth's less than 3 MHz, only wideband CQI is reported by the UE. Transmissions from the UL to the eNodeB are sent in the UL frequency band.

LTE is based on a rather flat architecture compared to 2G and 3G systems. Handovers between transceiver nodes are handled mainly by signaling directly between the eNodeBs, and not via any radio network controller node as in 2G and 3G. The transceiver node broadcasts an identifying signature, a "fingerprint" (Physical Cell Identity, PCI), which the mobiles use to identify transceiver nodes, and as time and frequency reference. These identifying signatures are not unique (there are 504 different PCI's in LTE).

In LTE a mobile is required to measure the reference signal received power (RSRP) (i.e. the received power of the signature sequence symbols associated with a particular PCI) of candidate transceiver nodes and report to the serving transceiver node (the transceiver node serving the mobile at the moment). It is important to detect and resolve local PCI conflicts, i.e. when two transceiver nodes in the vicinity of each other uses the same PCI, to avoid ambiguities in the measurement reports.

Overview of LTE Cell Selection and Reselection Criteria

The criteria for initial cell selection as well as cell reselection for LTE are specified in 3GPP TS 36.304 V8.6.0; UE procedures in idle mode (Release 8), which is incorporated herein by reference.

A summary of cell selection and cell reselection for LTE can be found at https://sites.google.com/site/lteencyclopedia/cell-reselection-procedures-in-lte. According to this summary, the reselection procedure uses information about carrier frequencies and optionally cell parameters received and stored from previously-detected cells. If no suitable cell is found using the stored information the UE starts with the initial cell selection procedure. $S_{rxlev}$ is the criterion defined to decide if the cell is still suitable. This criterion is fulfilled when the cell selection receive level is $S_{rxlev}>0$. $S_{rxlev}$ is computed based on the equation below:

$$S_{rxlev}=Q_{rxlevmeas}-(Q_{rxlevmin}+Q_{rxlevminoffset})-P_{Compensation} \text{ [dB]}$$

where $P_{Compensation}=\max(P_{EMAX}-P_{UMAX},0)$ [dB]

$Q_{rxLevmin}$ is the measured receive level value for this cell, i.e. the Reference Signal Received Power (RSRP).

This measured value is the linear average over the power of the resource elements that carry the cell specific reference signals over the considered measurement bandwidth. Consequently, it depends on the configured signal bandwidth. In the case of receiver diversity configured for the UE, the reported value will be equivalent to the linear average of the power values of all diversity branches.

$Q_{rxLevmin}$ is the minimum required receive level in this cell, given in dBm. This value is signaled as $Q_{rxLevmin}$ by higher layers as part of the System Information Block Type 1 (SIB Type 1). $Q_{rxLevmin}$ is calculated based on the value provided within the information element (−70 and −22) multiplied with factor 2 in dBm.

$Q_{rxlevminoffset}$ is an offset to $Q_{rxlevmin}$ that is only taken into account as a result of a periodic search for a higher priority PLMN while camped normally in a Visitor PLMN (VPLMN). This offset is based on the information element provided within the SIB Type 1, taking integer values between (1 . . . 8) also multiplied by a factor of 2 in dB. This gives a wider range by keeping the number of bit transmitting this information. The offset is defined to avoid "ping-pong" between different PLMNs. If it is not available then $Q_{rxlevminoffset}$ is assumed to be 0 dB.

$P_{Compensation}$ is a maximum function. Whatever parameter is higher, $P_{EMAX}-P_{UMAX}$ or 0, is the value used for $P_{Compensation}$. $P_{EMAX}$ [dBm] is the maximum power a UE is allowed to use in this cell, whereas $P_{UMAX}$ [dBm] is the maximum transmit power of an UE according to the power class to which the UE belongs. At the moment only one power class is defined for LTE, which corresponds to Power Class 3 in WCDMA that specifies +23 dBm. $P_{EMAX}$ is defined by higher layers and corresponds to the parameter $P-_{MAX}$ defined in 3GPP TS 36.331 V8.6.0; Radio Resource Control (RRC) specification (Release 8), which is incorporated herein by reference. Based on this relationship, $P_{EMAX}$ can take values between −30 to +33 dBm. Only when $P_{EMAX}>+23$ dBm $P_{Compensation}$ is it considered when calculating $S_{rxlev}$. The $P-_{MAX}$ information element (IE) is part of SIB Type 1 as well as in the "RadioResourceConfigCommon" IE, which is part of the SIB Type 2.

As explained above, all parameters except for $Q_{rxlevmeas}$ are provided via system information. In a real network a UE will receive several cells perhaps from different network operators. The UE only knows after reading the SIB Type 1 if this cell belongs to its operator's network (PLMN Identity). First the UE will look for the strongest cell per carrier, then for the PLMN identity by decoding the SIB Type 1 to decide if this PLMN is a suitable identity. Afterwards it will compute the $S_{rxlev}$ criterion and decide whether a cell is suitable or not.

As mentioned above, DL coverage depends on the transmission power of a transceiver node and this is why SeNBs have much smaller coverage than MeNBs due to the fact that they have a much smaller transmission power. However, UL coverage depends on the terminal transmission power which is more or less the same whether the terminal is transmitting to a SeNB or MeNB. This fact creates an imbalance in the UL and DL coverage in a HetNet scenario. A solution to this imbalance problem is to decouple UL and DL transceiver node association where DL transceiver node association is based on the DL received power whereas UL transceiver node association is based on pathloss.

In the embodiments a UE has a DL "anchor" base station, which provides for communication between the network and the UE. A UL base station does not need to always be allocated to the UE. Instead, for each flow or file transfer in the UL the UE finds the best suited base station to which to transmit.

First Embodiment

The UL transceiver node association based solely on received signal power/pathloss or coupling loss is not optimal in the sense that there are other factors that would affect the optimal UL transceiver node association, such as:

The different number of antennas on the MeNBs and SeNBs.

The different antenna gains for both types.

The maximum transmit power allowed for a UE to a certain node type.

The interference level in the UL.

The load on each eNB where a UE could be better off connecting to an eNB to which it has a slightly higher pathloss than the optimal eNB but the former node is less loaded than the latter.

The backhaul capacity of the eNB.

In a further modification, the backhaul capacity of the eNB may be a factor.

This embodiment provides a transceiver node selection mechanism that considers some or all of the above factors.

As explained above, DL and UL decoupling solves the problem of UL and DL coverage imbalance in HetNets. However, UL transceiver node association based on received signal power/pathloss only is not optimal for selecting the best eNB for a UE to transmit to. According to the embodiment, the UL transceiver node selection mechanism takes into account at least one other factor along with received signal power/pathloss; these are explained in detail in the following.

The different number of antennas on the MeNBs and SeNBs. If for example a MeNB has two antennas for a transceiver node and a SeNB has only one antenna for the transceiver node and assuming the pathloss from a UE to both nodes is the same, the diversity gain of two antennas at the MeNB would translate to a higher combined signal strength at the MeNB side (about 3 dB). Since MeNBs are expected to have more antennas than SeNBs because of the limited space on the SeNBs side, it is advantageous to take the number of antennas on the different eNB transceiver nodes into account.

The different antenna gains for both types. MeNBs and SeNBs have, typically, different antenna types where the receiver gain of these antennas is normally higher on the MeNBs side and it would be advantageous to consider this in the transceiver node association decision. Although the measured path loss has the antenna gain included in it but that would typically be for the first antenna port (the antenna of the transceiver node that is transmitting to the UE) in the transceiver node association procedure, so the UE still needs to know about the antenna gain of the rest of the antennas of the transceiver node.

The maximum transmit power allowed for a UE to a certain node type of transceiver node. For some types of SeNBs the maximum UL transmit power of UEs is limited to a lower value than that specified for MeNBs. For example, a UE could be allowed to transmit to a MeNB with 23 dBm whereas it is only allowed to transmit to the SeNB with 20 dBm only. This also would affect the received SINR (Signal to Interference plus Noise Ratio) at the receiving eNB and should be advantageously taken into account in the transceiver node association decision.

The interference level in the UL. A UE could have a low path loss to an eNB transceiver node but it receives a high level of interference when connected to this node so may be advantageous to connect to another node to which it has higher path loss but experiences a lower interference level when connected to that node.

The load on each eNB. A UE could obtain a better communication link by connecting to an eNB transceiver node to which it has a slightly higher path loss than the seemingly optimal eNB transceiver node if the former node is less loaded that the latter. Taking this into account can be considered to be more of a load balancing technique but it can be taken into considered in the transceiver node association decision.

The backhaul capacity of the eNB. The link between the eNB to which the UE is connected and the core network will have a particular capacity (e.g. the maximum data rate possible in the backhaul link), and this may be taken into consideration in the transceiver node association decision. The backhaul link may be wired or wireless. The backhaul capacity on a wired and wireless links are generally different. The backhaul capacity is straightforward as it depends on the data rate (Mbps) provided by the wired connection which is more or less fixed. In contrast, the wireless backhaul is more complicated as it requires nodes to calculate the interference received on the backhaul band in order to calculate the achieved capacity. Wireless backhaul interference is variable so the capacity should be calculated and broadcast more frequently than for wired backhaul.

This embodiment of this invention provides a new UL transceiver node association technique in a DL/UL decoupled scenario that takes into account some or all the above factors in order for a UE to choose to optimal transceiver node to connect to.

Control means is provided for performing UL and DL transceiver node selection. The control means in the embodiment is provided in the UE 1 at 21. However, the control means may alternatively be provided elsewhere, such as at the transceiver node 5 or network core 3 (or may be split between the UE 1, transceiver node 5 and/or network core 3).

Figure 5A:
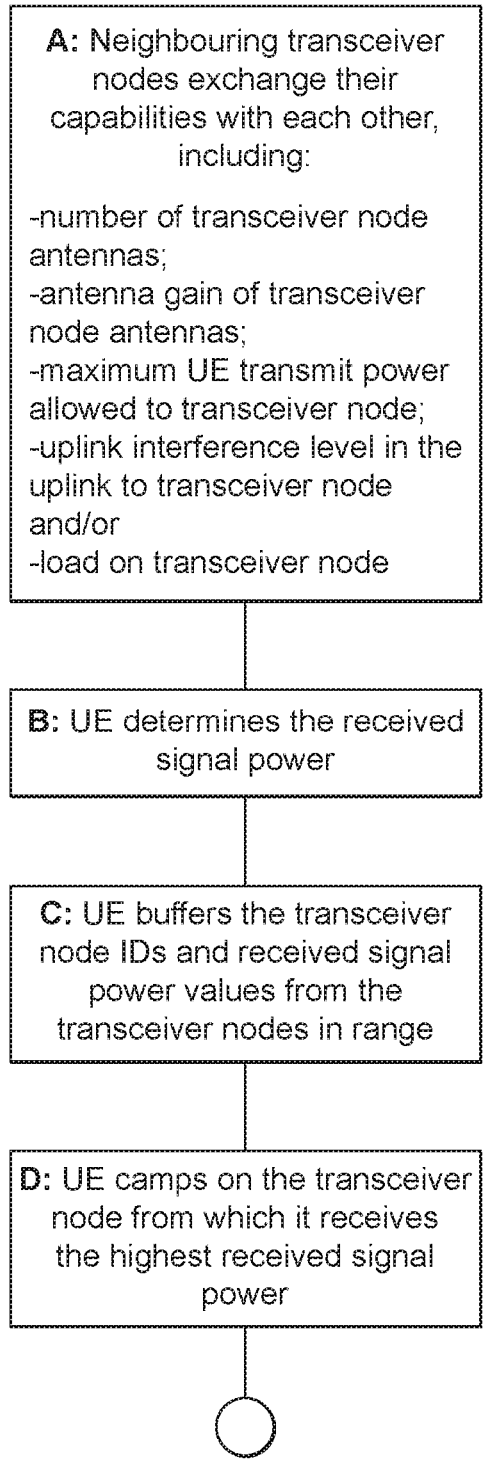
FIGS. 5A-5C are a flow chart showing a UL transceiver node association algorithm in accordance with the first embodiment.
Figure 5B:
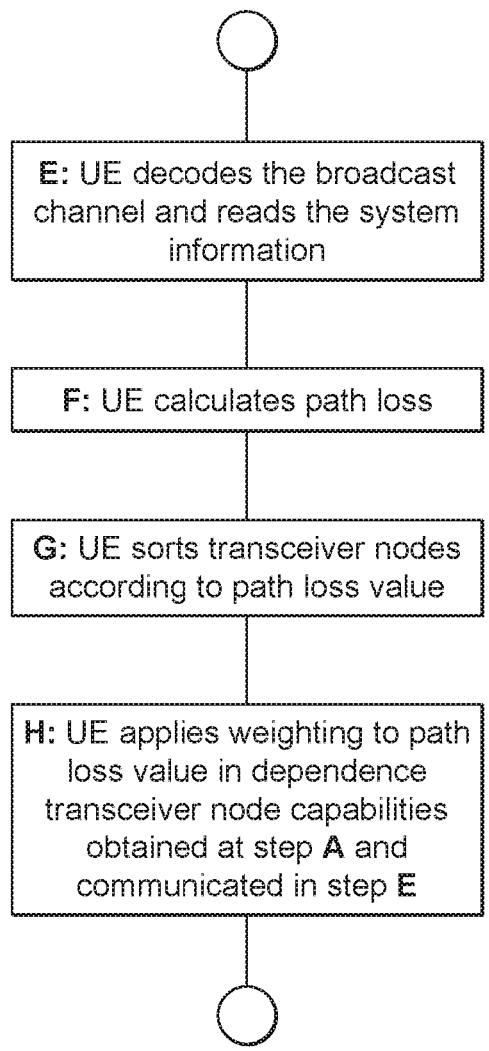
Figure 5C:
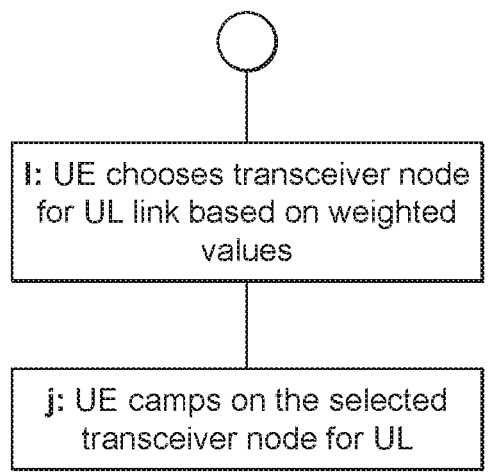

Considering an LTE embodiment, the UL transceiver node association algorithm implemented by the control means 21 may function as follows and as shown the flow-chart of in FIGS. 5A-5C:

1. Initially the neighbouring eNBs exchange their capabilities with each other such as Tx power level, number of antennas, antenna gain, max UE transmit power, transceiver node load, transceiver node received interference level (step A). This can be done in many ways (e.g.: CoMP, Coordinated Multipoint Transmission).
2. Each eNB includes its own capabilities in its system information (e.g. using SIB 2 in LTE)—e.g. number of antennas, antenna gain, max UE transmit power, transceiver node load, backhaul capacity, and transceiver node received interference level. Also each eNB includes the neighbouring transceiver node's capabilities in the neighbouring transceiver node list (e.g. using SIB4-SIB8)—e.g. number of antennas, antenna gain, max UE transmit power, transceiver node load, backhaul capacity, and transceiver node received interference level. The added fields will not consume a lot of resources (a few bits for each field) and since the eNBs have no limitation in the Tx power (as opposed to UEs), this should not affect much the operation.
3. UEs measure the reference signal received power (RSRP) from the different eNBs in range (flowchart Step B). The UE buffers the Transceiver node IDs and RSRP values from the transceiver nodes in range (step C).
4. The UE camps on the transceiver node from which it receives the highest RSRP (step D).

5. The UE starts decoding the broadcast channel (e.g. SIB 2 and 4-8) and reads the system information which include the serving and neighbouring eNBs capabilities (step E).
6. The UEs now have information about the Tx and Rx power from all eNBs and can calculate the path loss for all of them. Path loss can be calculated by subtracting the received signal power from the eNB transmit power (path loss=eNB transmit power−RSRP)—step F.
7. UEs sort the eNBs depending of their path loss (lowest to highest)—step G.
8. UEs starts weighting the path loss values for each eNB with the corresponding eNB capabilities (e.g. number of antennas, antenna gain, max UE transmit power, transceiver node load, backhaul capacity, and/or transceiver node received interference level)—step H.
9. UEs decide upon the UL eNB based on the weighted path loss values—step I.
10. UEs synchronise and camp on the selected eNB for UL (step J). So a UE in idle mode would be synchronised and camped on one eNB for the DL and another for the UL. When the UE wants to initiate an UL connection it sends a random access request directly to the UL eNB.

The procedure described above is performed when a UE is initially powered-up in the cellular network. After step 10 is performed, different transceiver nodes may be selected as the UE moves around the cellular network while in the idle mode. The procedure is as follows:
A. The UE is camps on a selected transceiver node (e.g. selected in step 10, above).
B. The UE starts decoding the broadcast channel and reads the system information which include the serving and neighbouring eNBs capabilities.
C. The UEs now have information about the Tx and Rx power from all eNBs and can calculate the path loss for all of them. Path loss can be calculated by subtracting the received signal power from the eNB transmit power (path loss=eNB transmit power−RSRP).
D. UEs sort the eNBs depending of their path loss (lowest to highest).
E. UEs starts weighing the path loss values for each eNB with the corresponding eNB capabilities (e.g. number of antennas, antenna gain, max UE transmit power, transceiver node load, backhaul capacity, and/or transceiver node received interference level).
F. UEs decide upon the UL eNB based on the weighted path loss values.
G. UEs synchronise and camp on the selected eNB for UL. So a UE in idle mode would be synchronised and camped on one eNB for the DL and another for the UL. When the UE wants to initiate an UL connection it sends a random access request directly to the UL eNB.

The new transceiver node association mechanism helps the UEs connect in the UL to optimum transceiver node in terms of pathloss, transceiver node antenna configuration, UE max transmit power, load, backhaul capacity and interference conditions. This cannot be achieved using conventional DL received power transceiver node association nor using the simple pathloss transceiver node association.

Although in this embodiment the UE uses the information about the number of antennas, maximum transmission, Tx, power, antenna gain, interference, backhaul capacity and load to decide to which node to connect, it should be appreciated that just one, or selected ones, of these criteria may be used to decide to which node to connect. Using just one of these criteria will provide an improvement over the prior art selection method with is based only on path loss.

As an alternative to the number of transceiver node antennas for each transceiver node being communicated in system information, the number of transceiver node antennas may be determined as follows. If two antennas are available for transmission, Space Time Frequency Coding (STFC) may be used as transmit diversity scheme for the Broadcast Channel, BCH. On the other hand, if four antennas are used combined SFBC/FSTD (space-frequency block coding/frequency-switched transmit diversity) may be used for BCH so UEs can get information on the number of transmitting antennas on an eNB by blindly detecting what transmit diversity scheme is used for (BCH). The BCH is protected with extensive repetition coding since it is expected to be received in a low SINR environment, e.g. a HetNet environment. Where the UE cannot decode the BCH, information in the BCH may be routed through the backhaul from the small transceiver node to the Macro transceiver node and the macro transceiver node could transmit it to the UE. Alternatively the number of antennas can be detected from the Transceiver node specific Reference Signals (CRS) pattern or simply by assuming that the eNBs transmits the number of antennas as part of their broadcast channel. Such information can be obtained in relation to the serving transceiver node when the UE is in the idle mode. For such information to be obtained about neighbouring transceiver nodes, the UE needs to enter an active/connected state.

Second Embodiment

The radio link quality is determined by several factors including pathloss, fading, interference, and transmit power of the devices.

The UL SINR (signal-to-interference-plus-noise ratio) of UE i connected to BS j is given by:

$$SINR_{UL\_ij} = \frac{\|h_{ij}\|^2 P_{U\_i}}{N+I} \quad (1)$$

Where:
$p_{ue}$ is UE transmit power ($P_{U\_i}$ for UE i),
h is the channel coefficient including pathloss, shadowing and fast fading ($h_{ij}$ for UE i connected to BS j),
I is the Uplink interference power of the other (interfering) signals in the network, and
N is some noise term, which may be a constant or random.

For simplicity, we use the Shannon capacity equation to model the data rate achieved by the UE i where for cell association we consider the wideband capacity achieved over the whole bandwidth BW. The maximum UL information transmission rate is given by:

$$C_{i_{UL\_Acess}} = BW \, \log_2(1 + SINR_{UL\_ij}) \quad (2)$$

Considering the backhaul constraint, especially at scells (Secondary Serving Cells, configured after connection establishment, to provide additional radio resources), the achievable data rate of a UE may be limited by the backhaul capacity (e.g. the maximum data rate possible in the backhaul link) of the serving cell ($C_{bk\_j}$). So the maximum UL UE capacity for BS j is given by:

$$C_{UL_{ij}} = \min\{C_{i_{UL\_Access}}(j), C_{bk\_j}\} \quad (3)$$

That is, the maximum UL UE capacity $C_{UL_{ij}}$ is the determined by the lower of the maximum UL information transmission rate $$C_{i_{UL\_Acess}}$$

and the backhaul capacity of the serving cell ($C_{bk\_j}$).

We then use a similar cell association criterion as the one that was previously considered in the DL in the following publications (which are hereby incorporated by reference): Kim, Hongseok, et al. "Distributed-optimal user association and cell load balancing in wireless networks." *Networking, IEEE/ACM Transactions on* 20.1 (2012): 177-190; and Fehske, Albrecht, et al. "Concurrent load-aware adjustment of user association and antenna tilts in self-organizing radio networks." (2013): 1-1.

In the previous publications the authors define the cell load as being the resource utilisation in cell. In the downlink this could be accurate enough to reflect the cell load but in the uplink this would be suboptimal since the user's UEs are normally power limited, so if a UE has a bad channel to the serving base station it might not be able to use all the resources assigned to it. So a BS might have a low resource utilisation but serving a relatively large number of UEs as well. So we use the average number of Users (or average number of flows) E[N] served by the BS j to reflect the load instead of the resource utilization.

In this embodiment the cell association criterion is used in an algorithm for the UL case, and the backhaul constraint is also used in the algorithm. The cell association criterion is given by the below equation (4) where E[N] represents the BS j load, $$s(i) = \underset{j \in B}{\operatorname{argmax}} \frac{C_{UL_{ij}}}{E[Nj] + 1} \quad (4)$$

B is the set of Base stations, so j belongs to the set B. The value $$\frac{C_{UL_{ij}}}{E[Nj] + 1}$$

is calculated for UE i for each of the BSs in set B. BS in set B with the highest value $$\frac{C_{UL_{ij}}}{E[Nj] + 1}$$

is identified by the cell association criterion s(i).

If there is a tie in the argmax operation, one of the BSs may be selected according to any suitable criterion, e.g. the BS with the lower index value.

Algorithm

A UL performance establishment technique based on the above calculations may be implemented by the following algorithm. The cell association technique that takes into account the, the UL SINR, the UL cell load and the backhaul capacity/constraint.

Combining the maximum backhaul capacity and the access link load of each eNB, which is assumed to be the same load on the backhaul link, the UE would know the available backhaul capacity that it can use as explained in the algorithm below.

The algorithm is fully distributed, meaning that the cell association decision is advantageously (but not essentially) taken by control means at the UE side as explained below.

It should be noted that a UE has its DL anchor base station and it does not need a constant UL connection, so for each flow or file transfer in the UL the UE finds the best situated BS to transmit to as explained in the below algorithm:

1. Each BS broadcasts its load or queue status η in each TTI (initially) and its backhaul capacity $C_{bk}$ less frequently (e.g. every second).
2. Each UE starts with a random wait time $T_W$ where the UE is idle, which counts down to 0.
3. When $T_W=0$, the UE has a flow in its queue for transmission and starts searching for the best BS to connect to.
4. UE measures the pathloss to each BS in range.
5. The UE calculates the maximum achievable UL rate to the BSs in range according to equation (2).
6. The UE decides on the maximum capacity that can be achieved through a BS by considering the backhaul capacity according to equation (3).
7. The UE uses equation (4) to decide which BS to connect to.
8. The UE is scheduled in the selected BS according to a proportional fair scheduler of suitable type.
9. After finishing the flow transmission the UE disconnects from the BS and is idle for a random period $T_W$ and repeats from step 4.

The cell association algorithm is further explained in the following pseudo code:

| | |
|---|---|
| 1. | BSs broadcast η and $C_{bk}$ periodically. |
| 2. | UE(1,...,K) are idle for a random $T_w$(1,...,K). |
| 3. | for nrof_TTI % The number of TTIs |
| 4. |   for each idle UE |
| 5. |     if $T_w = 0$ |
| 6. |       UE has a flow of random size ρ to transmit, UE_queue = ρ. |
| 7. |       UE connects to BS (i) according to equation 2, 3 and 4 |
| 8. |       UE is scheduled in BS (i) until UE_queue = 0. |
| 9. |       UE goes idle for a random $T_W$. |
| 10. |     else |
| 11. |       $T_w = T_w - 1$ |
| 12. |   end for |
| 13. | end for |

The first and second embodiments relate to preforming cell selection/reselection, which is performed by the UE when in an idle/inactive state.

In the first and second embodiments the control means is provided for performing UL and DL transceiver node selection. The control means in the embodiments is provided in the UE 1 at 21. However, the control means may alternatively be provided elsewhere, such as at the transceiver node 5 or network core 3 (or may be split between the UE 1, transceiver node 5 and/or network core 3).

Third Embodiment

As mentioned above, DL coverage is based on the transmission power of the transceiver node and that is why SeNBs have much smaller coverage than MeNBs due to the fact that they have a much smaller transmission power. However, UL coverage depends on the terminal transmission power which is more or less the same whether the terminal is transmitting to a SeNB or MeNB. This fact creates an imbalance in the UL and DL coverage in a HetNet scenario. This, in turn, results in high interference scenarios where MeNB UEs cause high interference to the SeNB UEs since the MeNB UEs may be very close to (or in) the coverage area of the SeNBs. This happens because UEs (both D2D UEs and cellular UEs) are power controlled in the uplink based on their pathloss to their serving eNB. When UEs are covered by the same eNB, they are scheduled in a manner so as not to cause interference at the receiving eNB. However, when they are covered by different cells that are nor synchronised or coordinated, avoiding (or mitigating) interference is not possible conventionally. This interference is much more severe in a Device-to-Device (D2D) scenario where the D2D connection is in band with and using the UL cellular resources of the transceiver node to which they are attached.

If two devices communicate in a D2D fashion in a SeNB, a MeNB UE that is very close to the SeNB coverage could cause a high level of interference to the D2D couple because the interference is received at the devices and not at the Scell as in a typical cellular connection.

In this embodiment we aim at solving the interference problem caused by cellular devices to D2D devices that are communicating in-band in a SeNB's coverage. In-band means that the D2D devices are using the same UL spectrum resources as the cellular devices.

In the third and fourth embodiments, the term D2D UE includes a device that is capable of performing normal cellular communications with the transceiver node to which it is attached. However, the D2D UE is also capable of performing direct communication with another UE (that is, direct communication of data between the devices that is not routed via any transceiver node). The direct communication may be in-band (using the cellular frequencies and other resources that are also used to communications sent via the transceiver nodes) and in accordance with Rel-12 LTE D2D. The term cellular UE refers to a device that communicates via the transceiver node to which it is attached.

A solution to this problem, according to the third embodiment, is to handover the MeNB cellular UE to the SeNB (only) in the UL which would reduce or solve the interference problem since this UE would be connected to the same cell as the D2D couple and also since this UE is close to the SeNB the UL link to the SeNB would be better than the one to the MeNB.

The DL relevant signalling and UL relevant signalling may be communicated between the SeNB and MeNB so that the DL relevant signalling would be transmitted by the device in the UL to the SeNB and relayed back to the MeNB through the X2 interface for example and vice-versa. If a fast connection is not available between the SeNB and MeNB a small UL and DL feedback channel could be setup between the device and the MeNB and SeNB respectively to handle the delay tolerant signalling only.

Figure 6A:
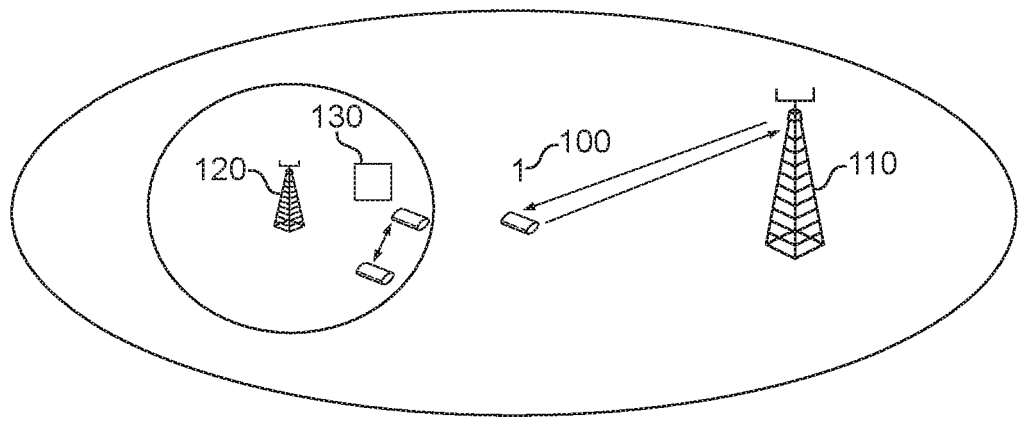
FIGS. 6A and 6B show elements of a network to explain the operation of a third embodiment of the invention.
Figure 6B:
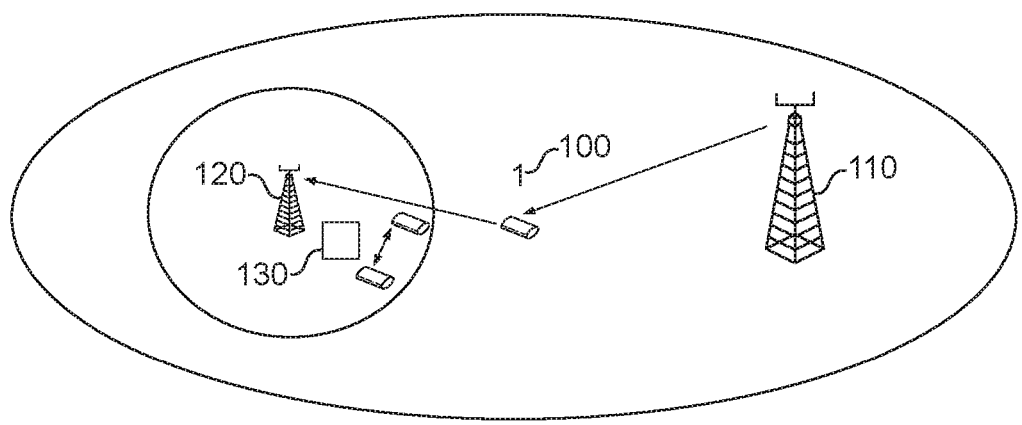

In the (e.g. 4G) HetNet that is shown in FIG. 6A, cellular UE 100 that is connected to/attached to/registered with the MeNB 110 and that is quite far from the MeNB 110 but is very close to the SeNB 120 coverage would be considered as a MeNB cell edge UE. FIGS. 6 and 7 show DL coverage areas. The DL coverage of a node depends on its transmit power whereas the UL coverage depends on the UE transmit power which is unchanged from MeNB (e.g. Macro) to SeNB (pico), so UL coverage is distance dependent. In that sense in FIG. 6A the UE i100 is in the UL coverage of the SeNB/Scell 120 (it is closer to the SeNB/Scell) 120 but is in the DL coverage of the MeNB/Mcell 110. This is why the handover is performed only in the UL.

Cell edge UEs can be defined as the UEs located furthest from the serving transceiver node or the UEs that have the worst channel to the serving transceiver node or the UEs that are closest to the coverage boundary between the MeNB 110 and the SeNB 120, but still within the coverage of the MeNB 110. These UEs (e.g. UE 100) cause a high level of interference to the D2D couple 130 (two UEs performing in band direct communication therebetween) that is located in the coverage area of the SeNB 120 especially if the D2D couple 130 is located near the cell edge of the SeNB 120. The interference is higher for the D2D devices since the interference is perceived at the devices 130 instead of at the transceiver node as in typical UL cellular interference.

According to the embodiment, the following procedure is performed by control means:

1. The D2D devices 130 that are in the SeNB 120 coverage calculate the interference level they receive. If it is higher than a predefined threshold, the D2D devices 130 signal a high interference to their serving cell (SeNB 120). This high interference situation could also be indirectly calculated by the SeNB 120 using e.g. CQI reports from the devices 130.
2. The SeNB 120 signals to the neighbouring cells over an interconnection interface (e.g. the X2 interface in LTE) the high level of interference received on the D2D resources 130.
3. The neighbouring cells, illustrated in FIG. 6A by the MeNB 110, signal their cell-edge UEs (UE 100 in FIGS. 6A and 6B) to measure their PL (pathloss) to the SeNB 120 (PL_SeNB) where the D2D 130 devices are interfered.
4. The cell-edge UEs 100 calculate the difference, PL_diff) between the PL to their serving cell (MeNB) 110, PL_MeNB and the SeNB 120 as follows: PL_diff=PL_MeNB—PL_SeNB.
5. PL_diff is signalled back to the MeNB 110.
6. If PL_diff is higher than a predefined threshold, the MeNB 110 signals the UE 100 to Handover its UL to the Scell 120. This results in the setup shown in FIG. 6B.
7. If PL_diff is lower than the threshold, the MeNB 110 may signal the UE 100 to reduce its transmit power to reduce the level of interference to the D2D devices 130. Additionally, or alternatively, the UE 100 is scheduled on different resources than the D2D devices 130.

According to the embodiment, the following procedure modified procedure may be performed (with position info):

1. The D2D devices 130 that are in the SeNB 120 coverage calculate the interference level they receive. If it is higher than a predefined threshold, the D2D devices 130 calculate their position (e.g. using location services from LTE Rel. 9; note that the calculation can also be directly performed by the network) and signal a high interference indicator along with their coordinates to their serving cell (SeNB 120). As above, the high interference situation could be indirectly calculated by the SeNB using e.g. CQI reports from the devices 130.

2. The SeNB 120 signals to the neighbouring cells over an interconnection interface (e.g. the X2 interface in LTE) a high interference level on the D2D resources indication along with the D2D devices' coordinates.
3. The neighbouring cells, illustrated in FIG. 6A, 6B by the MeNB 110, know the coordinates of the UEs in their coverage (using the same LTE Rel. 9 features/methods mentioned above) and they calculate the distance of the UEs (UE 100 in FIGS. 6A and 6B) to the D2D devices 130.
4. If the distance of a MeNB UE 100 from the D2D devices 230 is lower than a certain threshold this UE 100 is signalled by the MeNB 110 to calculate the PL to the SeNB 120 where the D2D devices 130 are interfered.
5. The UE 100 calculates the difference between the PL to its serving cell (MeNB 110) and the SeNB 120 as follows: PL_diff=PL_MeNB−PL_SeNB.
6. PL_diff is signalled back to the MeNB 110.
7. If PL_diff is higher than a predefined threshold, the MeNB 110 signals the 100 UE to Handover its UL to the Scell 120. This results in the setup shown in FIG. 6B.
8. If PL_diff is lower than the threshold the MeNB 110 may signal the UE 100 to reduce its transmit power to reduce the level of interference to the D2D devices 130. Alternatively, or additionally, the UE can be scheduled on different resources than the D2D devices.

This procedure is repeated for all the UEs in the MeNB 110 coverage.

This procedure mitigates the intercell interference problem for D2D devices 130 by changing the UL serving cell of an interfering UE 100, which may provide a much better performance than power control or scheduling solutions. It will also not affect the interfering UE 100 negatively since this UE 100 would connect to a cell 120 to which it has a better UL link or lower PL.

Fourth Embodiment

As mentioned above, in a scenario where two devices covered by a MeNB are communicating in a D2D fashion and are located near the cell edge of a MeNB, UEs covered by a SeNB located close to the same MeNB (above-mentioned) cell edge would both perceive and inflict a high level of interference from/to the D2D pair. This happens because both D2D UEs and cellular UEs are power controlled in the uplink based on their pathloss to their serving eNB. When UEs are covered by the same eNB, they are scheduled in a manner so as not to cause interference at the receiving eNB. However, when they are covered by different cells that are nor synchronised or coordinated, avoiding (or mitigating) interference is not possible conventionally. As mentioned above, this issue is even more pronounced when the interference is perceived by neighbouring (e.g. D2D) UEs.

In this embodiment we aim at solving the interference problem caused between cellular devices in a SeNB and in band D2D devices in a MeNB. In-band means that the D2D devices are using the same UL spectrum resources as the cellular devices.

A solution to this problem is to handover the D2D devices that are in the MeNB coverage to the SeNB (only) in the UL. This solves the interference problem since:
1. the D2D devices would be connected to the same cell as the cellular UE (which can e.g. be scheduled in subframes where there is no D2D transmission) and
2. the D2D devices are close to the SeNB. The UL link to the SeNB may be better than the one to the MeNB which would in turn reduce the D2D transmission power.

The DL relevant signalling and UL relevant signalling may be communicated between the SeNB and MeNB so that the DL relevant signalling would be transmitted by the device in the UL to the SeNB and relayed back to the MeNB through the X2 interface for example and vice-versa. If a fast connection is not available between the SeNB and MeNB a small UL and DL feedback channel could be setup between the device and the MeNB and SeNB respectively to handle the delay tolerant signalling only.

Figure 7A:
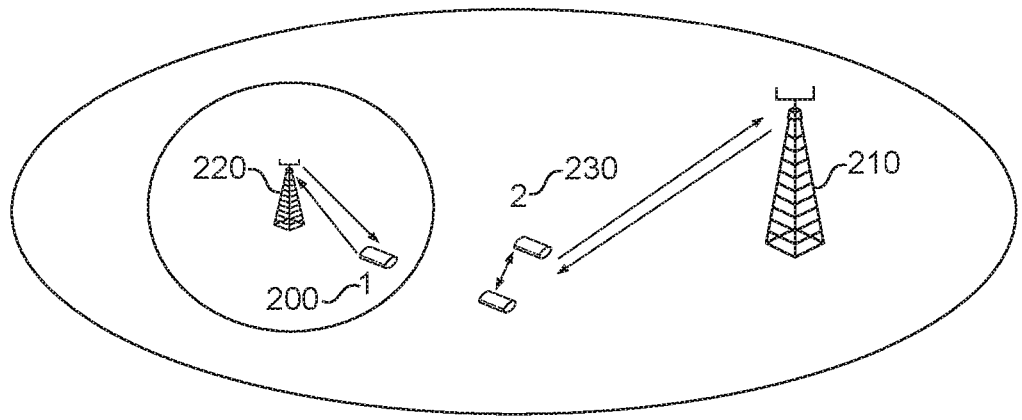
FIGS. 7A and 7B show elements of a network to explain the operation of a fourth embodiment of the invention.
Figure 7B:
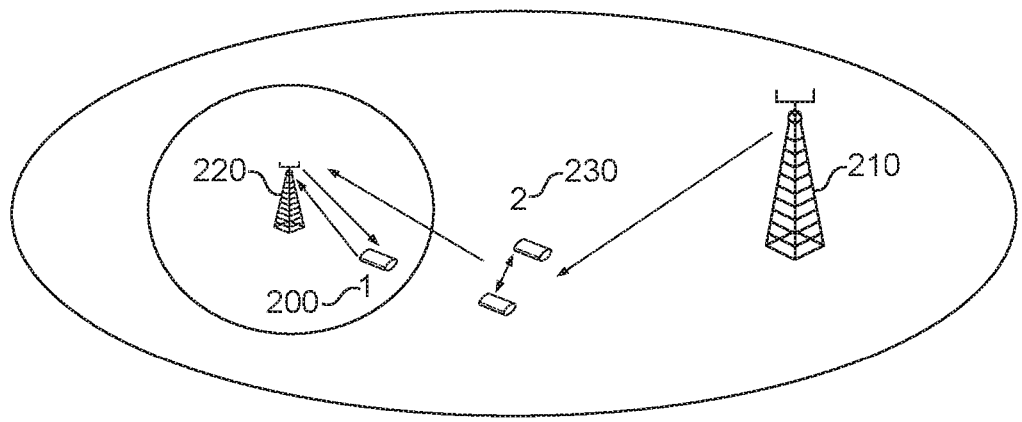

In the (e.g. 4G) HetNet that is shown in FIG. 7A, the D2D 230 couple is connected to the MeNB 210 but is quite far from the MeNB 210. In turn, the couple 230 is very close to (or in) the SeNB 220 coverage. This D2D pair 230 (being conventionally power controlled only to protect the serving MeNB 210) would be transmitting at high power thus causing a high level of interference to the SeNB cellular UE 200 that is located in the coverage area of the SeNB 220 especially if UE 200 is located near the cell edge of the SeNB 220. Similarly the SeNB UE 200 would cause a high interference to the D2D couple 230 in the MeNB 210 coverage since the interference is received at the devices rather than the serving cell as explained before. This interference scenario exists due to the lack of synchronization and/or coordination because the devices 200 and 230 are served by different transceiver nodes, which causes a time domain misalignment.

According to the embodiment, the following procedure may be performed by control means (Triggered by D2D devices):
1. The D2D devices 230 that are in the MeNB 210 coverage calculate the interference level they receive. If it is higher than a predefined threshold, the D2D devices 230 signal a high interference to their serving cell (MeNB 210). This high interference situation could also be indirectly calculated by the MeNB 210 using e.g. CQI reports from the devices 230.
2. The MeNB 210 signals the D2D couple 230 to measure the PL to the neighbouring SeNBs (SeNB 220 in this example), PL_SeNB, and calculate the difference (PL_diff) between the measured PL and the PL, PL_MeNB, to the MeNB 210 (serving cell): PL_diff=PL_MeNB−PL_SeNB.
3. PL_diff is signalled back to the MeNB 210.
4. MeNB 210 chooses the SeNB 220 with the highest PL_diff if PL_diff is higher than a predefined threshold and signals the D2D couple 230 to perform an UL only handover to the selected SeNB 220. This results in the setup shown in FIG. 7B.
5. If the highest PL_diff is lower than the threshold the MeNB 210 signals the highest interfering SeNB 220 (the one with largest PL_diff) to reduce the UL transmit power of their UE 200 and the MeNB 210 also signals the D2D devices 230 to reduce their transmit power. This way the interference is lowered in both directions.

According to the embodiment, the following modified procedure may be performed by control means (Triggered by D2D devices and using position info):
1. The D2D devices 230 that are in the MeNB 210 coverage calculate the interference level they receive. If it is higher than a predefined threshold, the D2D devices 230 signal a high interference to their serving cell (MeNB 210) along with their position (using location services from LTE Rel. 9; note that the calculation can also be directly performed by the network). This high interference situation could also be indirectly calculated by the MeNB 210 using e.g. CQI reports from the devices 230.
2. The MeNB 210 signals the neighbouring SeNBs (220 in this example) the high interference level on the D2D 230 devices resources.
3. The SeNBs (220 in this example) signal back to the MeNB 210 the location and transmit power of the cellular UEs (200 in this example) that is interfering with the D2D devices 230.
4. The MeNB 210 calculates the distance between the interfering UEs and the D2D devices 230. The level of interference received at the D2D devices 230 by the interfering UEs (UE 200 in this example) is calculated by dividing the UE 200 transmit power by the distance as follows (interference_level=UE 200_transmit_power/distance_UE_D2D 230).
5. The MeNB 210 calculates the highest interference level and signals the D2D devices 230 to calculate the pathloss, PL_SeNB, to the serving SeNB 220 of the most interfering cellular UE, and calculate the difference (PL_diff) between the measured PL, PL_SeNB, and the PL, PL_MeNB, to the MeNB 210 (serving cell): PL_diff=PL_MeNB−PL_SeNB.
6. PL_diff is signalled back to the MeNB 210.
7. If PL_diff is higher than a predefined threshold, the MeNB signals the D2D couple 230 to perform an UL only handover to the selected SeNB 220. This results in the setup shown in FIG. 7B.
8. If the highest PL_diff is lower than the threshold the MeNB 210 signals the highest interfering SeNB 220 (the one with largest PL_diff) to reduce the UL transmit power of their UE 200 and the MeNB 210 also signals the D2D devices 230 to reduce their transmit power. This way the interference is lowered in both directions.

According to the embodiment, the following procedure may be performed by control means (triggered by SeNB cellular UE):
1. The cellular UE 200 that is in the SeNB 220 coverage calculates the interference level it receives, if it is higher than a predefined threshold, the UE 200 signals a high interference to its serving cell (SeNB 220). This high interference situation could also be indirectly calculated by the SeNB 220 using e.g. CQI reports from the device 200.
2. The SeNB 220 signals to the neighbouring cells over an interconnection interface (e.g. the X2 interface in LTE) the high level of interference received by the UE 200 on the specific UE resources.
3. The neighbouring cells, illustrated in FIG. 7A by the MeNB 210, that have D2D devices 230 located near the cell edge would signal the D2D couple to measure the PL to the interfered SeNBs (SeNB 220 in this example), PL_SeNB, and calculate the difference, PL_diff, between the measured PL and their PL, PL_MeNB, to the MeNB (serving cell): PL_diff=PL_MeNB−PL_SeNB.
4. PL_diff is signalled back to the MeNB 210.
5. If PL_diff is higher than a predefined threshold, the MeNB signals the D2D couple 230 to perform an UL only handover to the selected SeNB 220. This would result in the setup shown in FIG. 7B.
6. If the PL_diff is lower than the threshold the MeNB 210 signals the D2D devices 230 to reduce their transmit power and/or the SeNB signals the UE 200 to reduce its transmit power.

These procedures mitigate the intercell interference problem in D2D by changing the UL serving cell of an interfering UE which may provide a much better performance than the power control or scheduling solutions. It will also not affect the interfering UE negatively since this UE would connect to a cell to which it has a better UL link or lower PL.

Only one of the procedures needs to be performed.

The third and fourth embodiments relate to preforming handover/handoff, which is performed by the UE when in an active or connected state.

In the third and fourth embodiments the control means is provided for performing UL and DL transceiver node selection. The control means in the embodiments is implemented on multiple elements of the network—for example, including the UEs and transceiver nodes. However, the control means may alternatively be provided elsewhere, such as at the network core 3.

In the embodiments the DL transceiver node association may be performed in the known manner, based on RSRP values.

The invention may be used to determine the most appropriate transceiver node to select in a wireless network. The term "transceiver node" used herein includes any (wireless) node that allows wireless connection of a UE to the wireless network, and includes a base station, cell site, BTS, NodeB, eNodeB, access point, access node, femto cell and pico cell, as well as the MeNBs and SeNBs mentioned in the embodiment. The invention is not limited to a network that comprises transceiver nodes that operate at difference maximum powers (such as MeNBs and SeNBs).

Although the embodiments have been described with reference to an LTE (4G) network, it should be appreciated that the invention is applicable to any type of (e.g. wireless) telecommunication network—such as a 2G, 2.5G, 3G cellular network, a WLAN or a 5G (or later generation) cellular network.

The invention claimed is:
1. A mobile telecommunications network comprising:
at least one mobile telecommunications device,
a plurality of transceiver nodes, wherein the mobile telecommunications device is associated with at least one of the plurality of transceiver nodes for downlink communications, wherein the telecommunications device is associated with the at least one of the plurality of transceiver nodes for uplink communications, and wherein the downlink transceiver node association is decoupled from the uplink transceiver node association, and
control means provided at the mobile communications device and operable to choose at least one of the plurality of transceiver nodes for use by the mobile telecommunications device for the uplink communications and to choose another at least one of the plurality of transceiver nodes for use by the mobile telecommunications device for the downlink communications,
wherein the control means is operable to choose the at least one of the plurality of transceiver nodes for use by the mobile telecommunications device for the uplink communications based upon at least one criterion that is independent of received signal power at the mobile telecommunications device from the at least one of the plurality of transceiver nodes for the uplink communications,
wherein the control means is operable to choose the at least one of the plurality of transceiver nodes for use by the mobile telecommunications device for the uplink communications and the another of the plurality of transceiver nodes for use by the mobile telecommunications device for the downlink communications while the mobile telecommunications device is in an idle communication state, and wherein the control means is operable to receive at least one characteristic of each of the plurality of transceiver nodes from a serving transceiver node, and to choose the one of the plurality of transceiver nodes for use by the mobile telecommunications device for the uplink communications based upon the at least one criterion that is independent of received signal power, wherein the at least one criterion includes the at least one characteristic of the transceiver node.

2. The network of claim 1, wherein the at least one criterion that is independent of received signal power is independent of path loss at the mobile telecommunications device from the at least one of the plurality of transceiver nodes for the uplink communications.

3. The network of claim 1, wherein the control means is operable to choose the at least one of the plurality of transceiver nodes for use by the mobile telecommunications device for the uplink communications without requiring the transmission of data from the mobile telecommunications device to any of the plurality of transceiver nodes.

4. The network of claim 1, wherein the control means is further operable to choose the at least one of the plurality of transceiver nodes for use by the mobile telecommunications device for uplink communications based upon a criterion that includes path loss.

5. The network of claim 1, wherein the control means is further operable to choose the at least one of the plurality of transceiver nodes for use by the mobile telecommunications device for uplink communications based upon a criterion that includes SINR (signal-to-interference-plus-noise ratio).

6. The network of claim 1, wherein the serving transceiver node comprises the at least one of the plurality of transceiver nodes chosen by the control means for use by the mobile telecommunications device for the downlink communications.

7. The network of claim 1, wherein the characteristic of the transceiver node includes the configuration of transceiver node antenna(s).

8. The network of claim 1, wherein the characteristic of the transceiver node includes the number of the transceiver node antennas.

9. The network of claim 1, wherein the characteristic of the transceiver node includes the antenna gain of the or each of the transceiver node antennas.

10. The network of claim 1, wherein the characteristic of the transceiver node includes the maximum uplink transmit power allowed by the transceiver node from the mobile telecommunications device.

11. The network of claim 1, wherein the characteristic of the transceiver node includes the load thereof.

12. The network of claim 1, wherein the characteristic of the transceiver node includes the backhaul capacity thereof.

13. The network of claim 1, wherein the characteristic of the transceiver node includes the interference level in the uplink to the transceiver node from the mobile telecommunications device.

14. The network of claim 4, wherein the control means is operable to choose the at least one of the plurality of transceiver nodes for use by the mobile telecommunications device for the uplink communications based upon at least one criterion that is independent of received signal power, and wherein the control means is further operable to choose the at least one of the transceiver nodes for use by the mobile telecommunications device for uplink communications by:

calculating a value that is derived from the received signal power and that is adjusted in dependence upon at least one of:
the number of the transceiver node antennas;
the antenna gain of the or each of the transceiver node antennas;
the maximum uplink transmit power allowed by the transceiver node from the mobile telecommunications device;
the load of the transceiver node;
the backhaul capacity; and
the interference level in the uplink to the transceiver node from the mobile telecommunications device; and using the adjusted value to choose the at least one of the transceiver nodes for use by the mobile telecommunications device for uplink communications.

15. The network of claim 1, wherein the at least one criterion that is independent of received signal power includes a characteristic of a neighboring one of the plurality of transceiver nodes different to the at least one of the plurality of transceiver nodes for the uplink communications.

16. The network of claim 15, wherein the characteristic of the neighboring one of the plurality of transceiver nodes includes the received signal power therefrom at the mobile telecommunications device.

17. The network of claim 15, wherein the characteristic of the neighboring one of the plurality of transceiver nodes includes path loss (PL_MeNB) therefrom at the mobile telecommunications device.

18. The network of claim 17, wherein the control means is operable to choose the at least one of the plurality of transceiver nodes for use by the mobile telecommunications device for the uplink communications in dependence upon the path loss (PL_MeNB) from the neighboring one of the plurality of transceiver nodes at the mobile telecommunications device and path loss (PL_SeNB) from the at least one of the plurality of transceiver nodes at the mobile telecommunications device.

19. A method of operating a mobile telecommunications network including at least one mobile telecommunications device and a plurality of transceiver nodes, wherein the mobile telecommunications device is associated with at least one of the plurality of transceiver nodes for downlink communications and is associated with at least one of the plurality of transceiver nodes for uplink communications, wherein the downlink transceiver association is decoupled from the uplink transceiver node association, the method comprising:

choosing, at the mobile telecommunications device, at least one of the plurality of transceiver nodes for use by the mobile telecommunications device for uplink communications, and choosing another one of the plurality of transceiver nodes for use by the mobile telecommunications device for downlink communications, wherein the at least one of the plurality of transceiver nodes for use by the mobile telecommunications device for the uplink communications is chosen based upon at least one criterion that is independent of received signal power at the mobile telecommunications device from the at least one of the plurality of transceiver nodes for the uplink communications, and wherein choosing the at least one of the plurality of transceiver nodes for use by the mobile telecommunications device for the uplink communications and choosing the another of the plurality of transceiver nodes for use by the mobile telecommunications device for downlink communications is performed while the mobile telecommunications device is in an idle communication state, the method further comprising receiving at least one characteristic of each of the plurality of transceiver nodes from a serving transceiver node and choosing the one of the plurality of transceiver nodes for use by the mobile telecommunications device for the uplink based at least upon the one criterion that is independent of received signal power, wherein the at least one criterion includes the at least one characteristic of the transceiver node.

* * * * *